US007561902B2

(12) United States Patent
Jo

(10) Patent No.: US 7,561,902 B2
(45) Date of Patent: Jul. 14, 2009

(54) APPARATUS AND METHOD FOR INPUTTING CHARACTER AND NUMERALS TO DISPLAY OF A MOBILE COMMUNICATION TERMINAL

(75) Inventor: Won-Hyung Jo, Seoul (KR)

(73) Assignee: Zacod Co., Ltd., Seoul (KR)

( * ) Notice: Subject to any disclaimer, the term of this patent is extended or adjusted under 35 U.S.C. 154(b) by 586 days.

(21) Appl. No.: 10/581,179

(22) PCT Filed: Dec. 9, 2004

(86) PCT No.: PCT/KR2004/003220

§ 371 (c)(1),
(2), (4) Date: Jun. 1, 2006

(87) PCT Pub. No.: WO2005/057889

PCT Pub. Date: Jun. 23, 2005

(65) Prior Publication Data

US 2007/0115146 A1 May 24, 2007

(30) Foreign Application Priority Data

Dec. 9, 2003 (KR) .................. 10-2003-0088814

(51) Int. Cl.
*H04M 1/00* (2006.01)
(52) U.S. Cl. ............ 455/575.1; 455/575.4; 379/433.12; 341/22
(58) Field of Classification Search ........... 455/575.1, 455/575.4; 341/22; 379/433.12

See application file for complete search history.

(56) References Cited

U.S. PATENT DOCUMENTS

| 4,498,143 | A | * | 2/1985 | Strzelecki | .................. 715/263 |
| 4,855,740 | A | * | 8/1989 | Muramatsu et al. | .......... 341/23 |
| 5,818,361 | A | * | 10/1998 | Acevedo | ...................... 341/23 |
| 6,761,462 | B2 | * | 7/2004 | Yoshida | ...................... 362/109 |
| 2004/0108994 | A1 | | 6/2004 | Kato | |
| 2005/0059438 | A1 | * | 3/2005 | Jellicoe | ................. 455/575.1 |

FOREIGN PATENT DOCUMENTS

| JP | 9-116605 | 5/1997 |
| JP | 11-220523 | 8/1999 |
| JP | 2003-15808 | 1/2003 |
| KR | 2002-0063068 | 8/2002 |

* cited by examiner

*Primary Examiner*—Timothy Edwards, Jr.
(74) *Attorney, Agent, or Firm*—Ladas & Parry LLP

(57) ABSTRACT

Disclosed is an apparatus and method for inputting character and numerals to display of a mobile communication terminal. According to the present invention, consonant letters of a language are marked on each key of the keypad, and vowel letters are arranged in at least four directions (upper, lower, left, right, and diagonal) along the sliding directions of the keypad. In the case of a keypad with Korean alphabets, a user inputs a consonant by pressing a key on the keypad, and slides the keypad in 4 directions at least to input a desired vowel. In the case of a keypad with Roman alphabets, a user inputs two kinds of consonants by pressing keys on the keypad, and slides the keypad in 4 directions at least to input a desired vowel. Likewise, in the case of a keypad with Japanese alphabets, a user inputs (I) on each row by pressing a key on the keypad, and slides the keypad in 4 directions at least to input (II), and other special characters and functional keys.

18 Claims, 17 Drawing Sheets

Upward

Downward

Left

Right

Upper left

Upper right

Lower left

Lower right

APPARATUS AND METHOD FOR INPUTTING CHARACTER AND NUMERALS TO DISPLAY OF A MOBILE COMMUNICATION TERMINAL

TECHNICAL FIELD

The present invention relates in general to an apparatus and method for inputting characters and numerals. More specifically, the present invention relates to an apparatus and method for inputting characters and numerals to display of a mobile communication terminal, wherein a keypad with all kinds of buttons slides from the center in at least four directions within the main body so that a user can more easily input characters or numerals

BACKGROUND ART

Rapid advances in communication technology have made it possible for a mobile user to have any conversations or send a text message while moving. Mobile communication terminals such as mobile phones, PDAs, pocket PCs and Internet terminals now have a wide range of applications.

Particularly, technical advances in a wireless personal communication service and a sharp increase in the number of subscribers to the service have prompted various kinds of additional services, which are currently available.

Among those additional services is the text-message transmission service through a (voice) communication terminal. Because of its convenience, many subscribers have been using the service.

The text-message transmission is made it possible through a miniature keyboard such as an electronic keypad to which a subscriber inputs a message to be sent.

The miniature keyboard have a wide range of applications, including Palm Top computers, Internet TVs, digital still cameras, PDAs, electronic organizers, kiosks for use in public buildings and other places in need of guidance, electronic keys, ATMs and so forth.

To be able to provide the text-message transmission service involving the miniature keyboard with a limited number of buttons such as an electronic telephone keypad, it is very important to arrange on the keypad consonants/vowels of a language to be supported in such a manner that a user is able to find desired letters more quickly and combine consonants and vowels more easily by operating the functional keys available.

A number of attempts have been made to meet the aforementioned technical needs, but the conventional techniques relevant to the character input schemes using the electronic telephone keypad could not satisfy such needs. For example, consonant and vowels on the keypad were randomly mixed together, so it took a long time for users to memorize where the characters are located. In addition, users had to input a period mark every time a letter was complete, which was another inconvenience to most of them.

Although recently developed devices and methods for text input solved some of the existing problems, manufacturers are still hesitating on whether to produce those new devices because cost of manufacture was considerably increased and technical problems causing inconvenience to users were not completely resolved yet.

On the other hand, X-coordinate, X Y-coordinate, and consecutive push input systems being currently used in PCS have many problems. For instance, to create a text message users have to use not only a separate mode conversion button but also functional keys including arrow keys. That is, a large number of key input operations are required and needless to say, it took a long time for the users to read coordinates on the keypad.

In addition, the related art character input methods using the electronic telephone keypad have a very different input system from that of typical word processors, whereby many users were often frustrated for operating keys. Especially, in case that a plurality of consonants and vowels are assigned to a single button, no matter how well organized the characters are, it takes much efforts and time to learn the positions of characters and the key operations.

The importance and role of the proper methods and apparatuses for inputting characters in a mobile communication terminal will be magnified by the fact that in next generation image mobile phone businesses IMT-2000 terminals will soon be used in wireless network making it possible for users to communicate data over very high speed wireless Internet. Therefore, to use a mobile communication terminal as an ideal compound multimedia equipment as many users now hope, it would be highly advantageous to provide methods and an apparatus for inputting characters in a mobile communication terminal that overcome the disadvantages and limitations found in the existing displays and input systems.

DISCLOSURE OF INVENTION

It is, therefore, an object of the present invention to provide an apparatus and method for inputting characters and numerals to a display of a mobile communication terminal, wherein a keypad with all kinds of buttons slides from the center in at least four directions within the main body to facilitate the input of characters and numerals.

It is another object of the present invention to provide an apparatus and method for inputting characters and numerals to a display of a mobile communication terminal at a remarkably high input speed, wherein consonants and vowels of a language are arranged in each of sliding directions (which is more than four) of a keypad with buttons so that a user can input at least two phonemes by operating one key.

To achieve the above object, there is an apparatus for inputting characters and numerals to a display of a mobile communication system for use with communication with another user or data storage, the apparatus including: a keypad having a plurality of buttons and consonants and vowels of each language out of Korean, Roman, Japanese and Chinese, numerals, functional keys allocated in at least four sliding directions, and generating a key signal according to the button operation of a user who wants to input a character or a numeral, and the sliding motion of the keypad in at least four directions centering around a the user within a main body of the mobile communication terminal; a character storage for storing character data of each language supported by the mobile communication terminal; a program memory for storing an internal operating program of the mobile communication terminal; a code storage for storing code data corresponding to the buttons arranged on the keypad and the sliding directions of the keypad; a button-operation recognition unit for detecting a key operating state of each of the buttons on the keypad; a keypad sliding recognition unit for detecting a key operating state according to the sliding motion of the keypad in at least four direction;

a microprocessor, driven by the operating program in the program memory in response to a key operation state detection signal inputted through the button-operation recognition unit and/or the keypad sliding recognition unit, for deciding with reference to the character data in the character storage which phoneme of what language the user inputs, generating a display control signal for displaying the phoneme of the corresponding language referring to the code data in the code storage, and outputting the phoneme; a display driving unit, under a display control signal outputted from the microprocessor, for outputting a driving control signal displaying a character and a numeral the user selects by pressing a button on the keypad or sliding the keypad in a desired direction; and a display, under the driving control signal outputted form the display driving unit, for displaying on a screen the character and the numeral the user selects.

Another aspect of the present invention provides a method for inputting characters and numerals to a display of a mobile communication terminal, the method including the steps of: (1) in a microprocessor of the mobile communication terminal, deciding which language alphabet mode is selected by a user; (2) in the microprocessor of the mobile communication terminal, deciding the language alphabet mode the user selected is one of Korean input mode, Roman input mode, and Japanese input mode; (3) if the user selects the Korean input mode, detecting, in the microprocessor, a key signal inputted from a button-operation recognition unit and/or a keypad sliding recognition unit in accordance with the operation of a plurality of buttons on a keypad or the sliding operation of the keypad in upward, downward, left, right and diagonal directions, combining Korean consonant and vowels and numerals/symbols, and displaying a result thereof on a screen of the mobile communication terminal; (4) if the user selects the Roman input mode, detecting, in the microprocessor, a key signal inputted from the button-operation recognition unit and/or the keypad sliding recognition unit in accordance with the operation of a plurality of buttons on the keypad or the sliding operation of the keypad in upward, downward, left, right and diagonal directions, combining consonant and vowels and numerals/symbols, and displaying a result thereof on the screen of the mobile communication terminal; (5) if the user selects the Japanese input mode, detecting, in the microprocessor, a key signal inputted from the button-operation recognition unit and/or the keypad sliding recognition unit in accordance with the operation of a plurality of buttons on the keypad or the sliding operation of the keypad in upward, downward, left, right and diagonal directions, combining Hiragana, Katakana, Chinese and numerals/symbols, and displaying a result thereof on the screen of the mobile communication terminal; (6) if a character input process in one of the input modes including the Korean input mode, the Roman input mode and the Japanese input mode is complete, deciding, in the microprocessor, whether the user selects a key signal for storing the input characters, and storing the input characters according to the user's selection; and (7) in the microprocessor, maintaining or ending the character mode according to the user's selection whether to end the character mode or not.

BRIEF DESCRIPTION OF DRAWINGS

The above objects, features and advantages of the present invention will become more apparent from the following detailed description when taken in conjunction with the accompanying drawings, in which.

BEST MODE FOR CARRYING OUT THE INVENTION

A preferred embodiment of the present invention will now be described with reference to the accompanying drawings.

Figure 1:
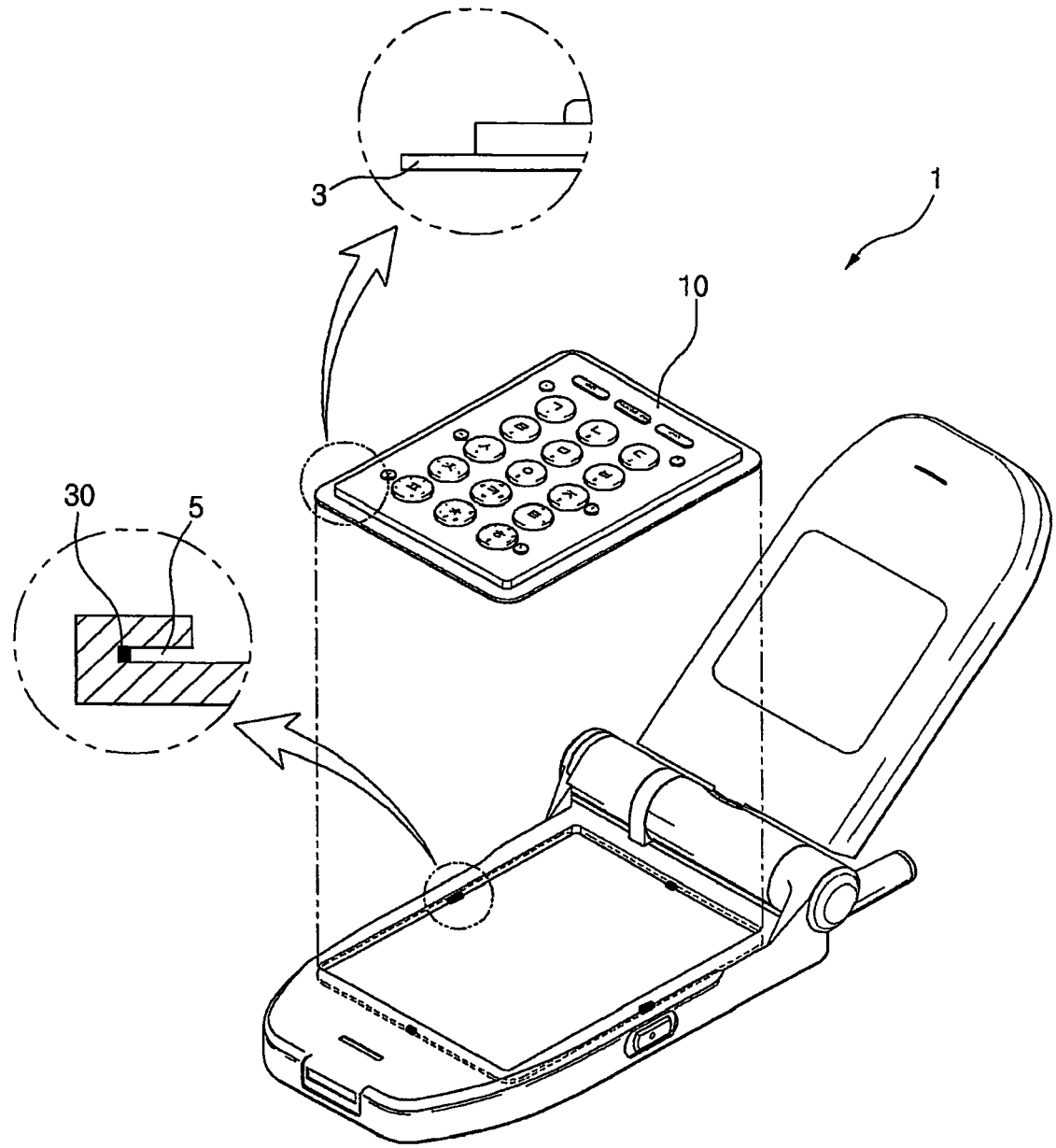
FIG. 1 is a schematic diagram of a mobile communication terminal according to the present invention.
Figure 2:
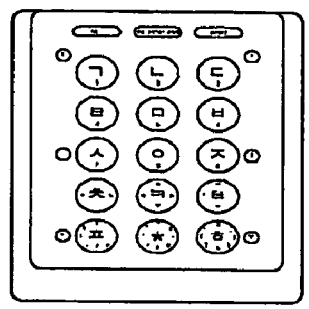
FIG. 2 is a diagram explaining the operational sate of a keypad on a mobile communication terminal according to the present invention.
Figure 2:
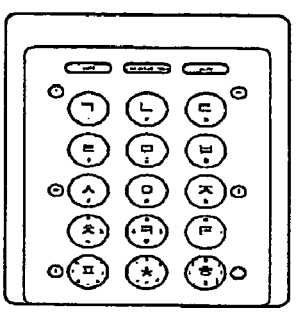
Figure 2:
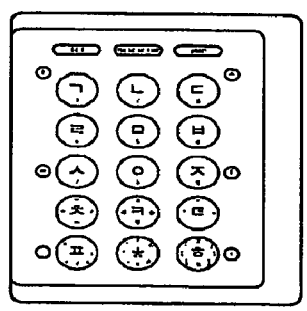
Figure 2:
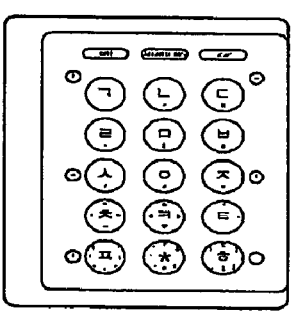
Figure 2:
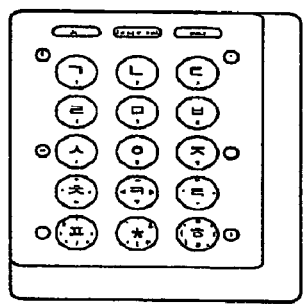
Figure 2:
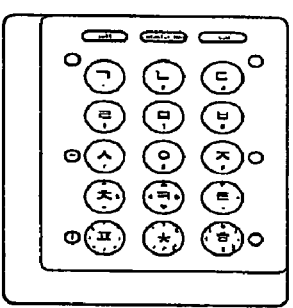
Figure 2:
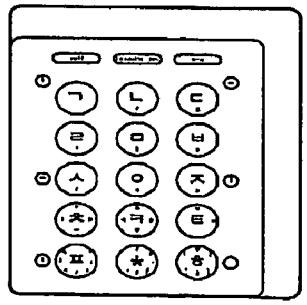
Figure 2:
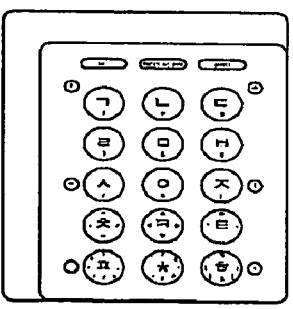
Figure 3:
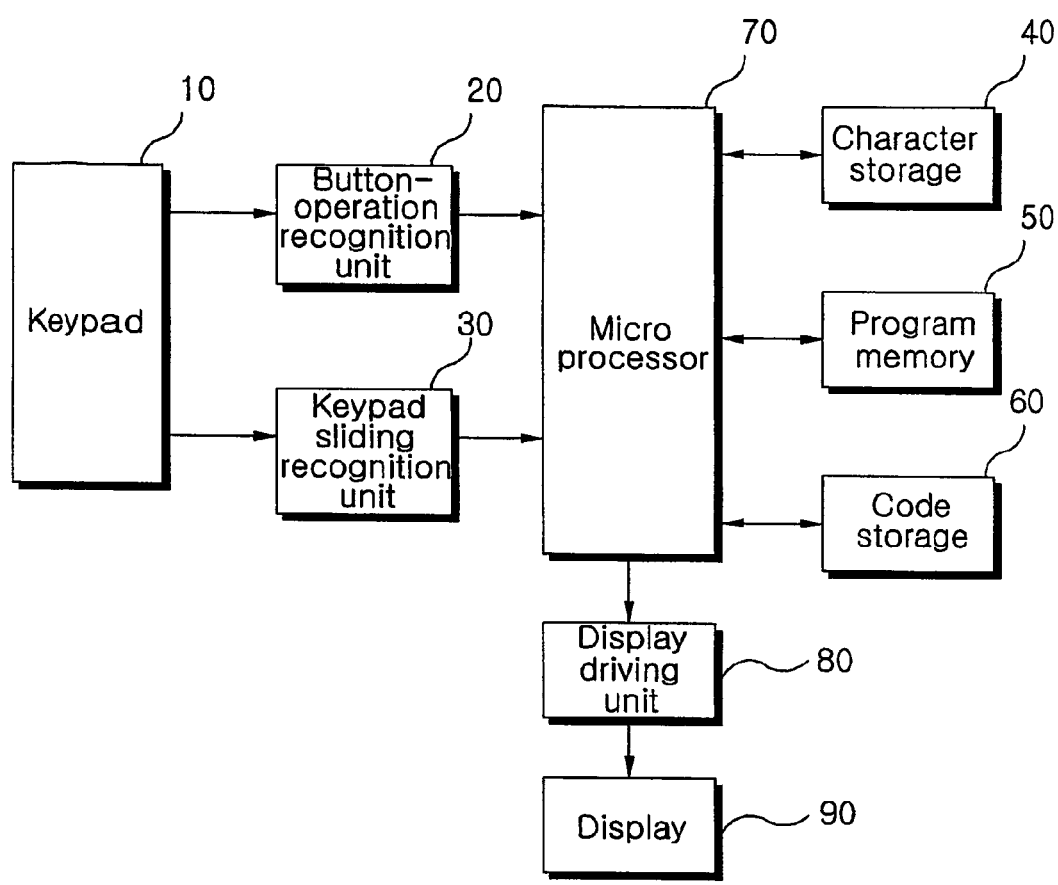
FIG. 3 is a schematic block diagram illustrating the internal structure of an apparatus for inputting characters/numerals in a mobile communication terminal according to one embodiment of the present invention.

FIG. 1 is a schematic diagram of a mobile communication terminal according to the present invention; FIG. 2 is a diagram explaining the operational sate of a keypad on the mobile communication terminal according to the present invention; and FIG. 3 is a schematic block diagram illustrating the internal structure of an apparatus for inputting characters/numerals in the mobile communication terminal according to one embodiment of the present invention.

As shown in the drawing, the keypad 10 includes a plurality of buttons for inputting foreign languages such as Korean, Roman, Japanese and Chinese, numerals, and special characters. Particularly, the keypad 10 of the present invention is made slidable in at least four directions, i.e., upward, downward, left, right, and diagonal (upper left and lower right), within a main body 1 of the mobile communication terminal according to the user's operation. One of preferable methods to make the keypad 10 slide, an edge(3) of the keypad 10 is inserted into a groove 5 formed in the main body 1 as depicted in FIG. 1 so that the keypad 10 can move in upward, downward, left, right and diagonal directions within the groove 5. The above method is illustrative only, and there could be other ways to combine the keypad 10 and the main body 1.

Figure 4:
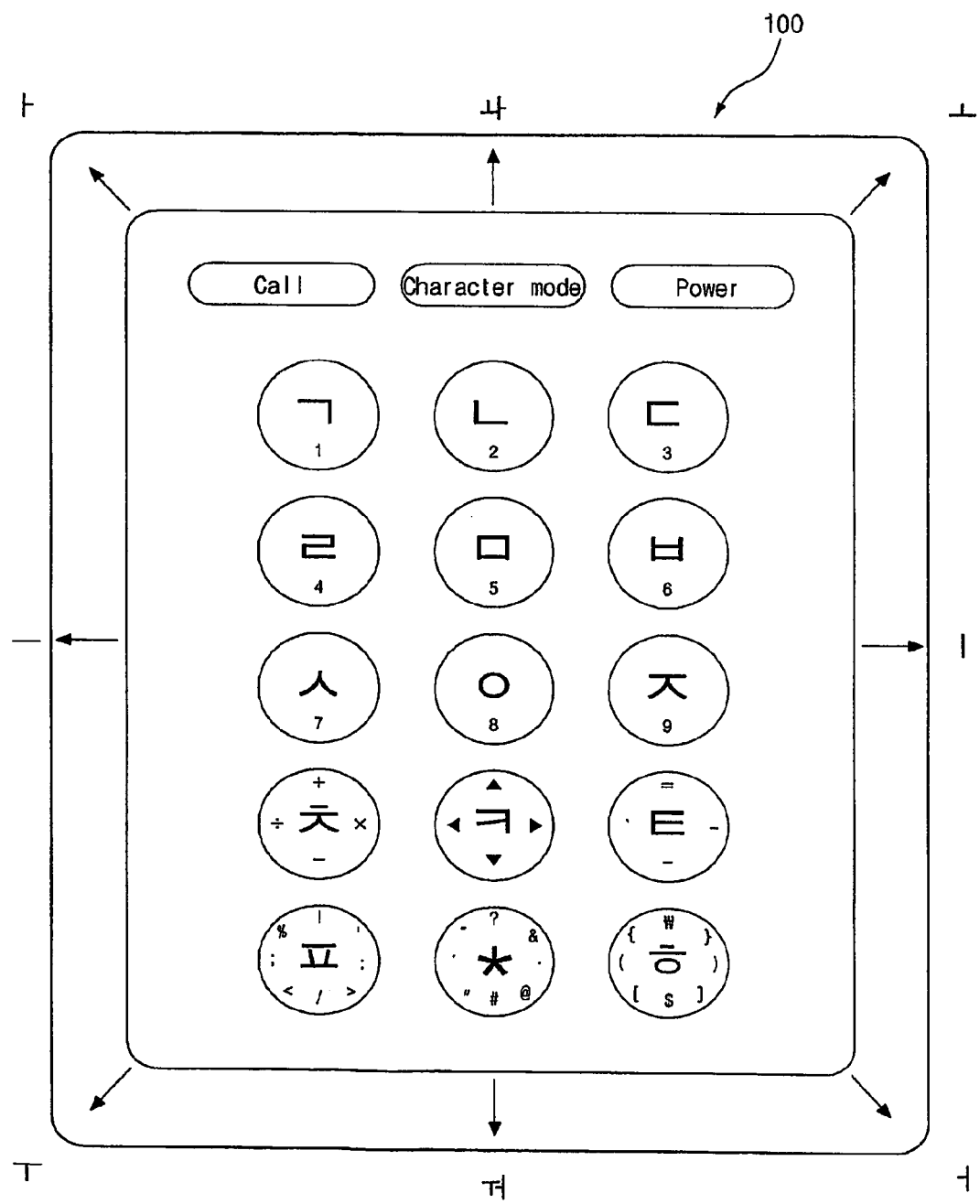
FIG. 4 illustrates a Korean alphabet (Hangul) keypad for use with an apparatus for inputting characters/numerals to a display of a mobile communication terminal according to the present invention.
Figure 6:
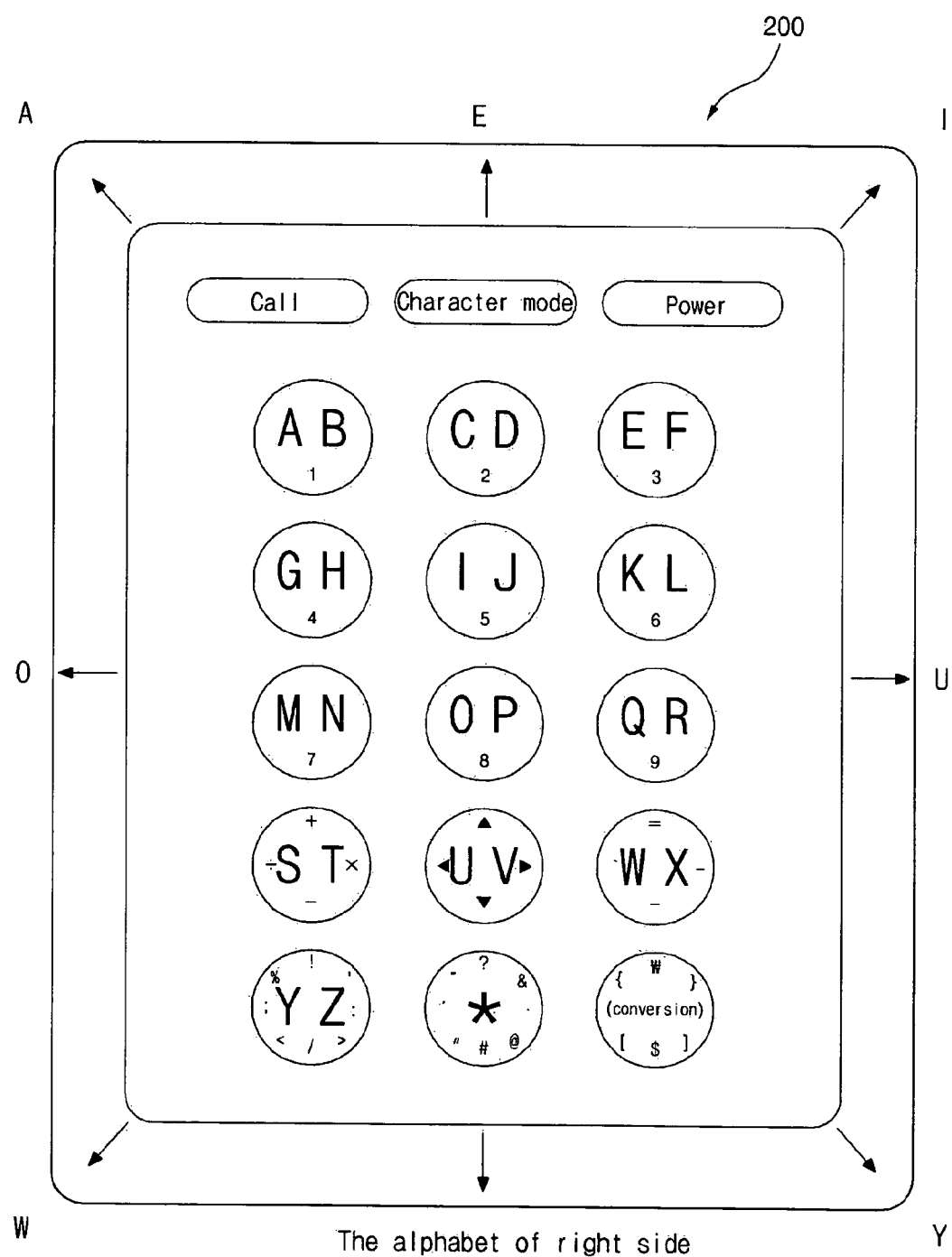
FIG. 6 illustrates a Roman alphabet keypad for use with an apparatus for inputting characters/numerals to a display of a mobile communication terminal according to the present invention.
Figure 8:
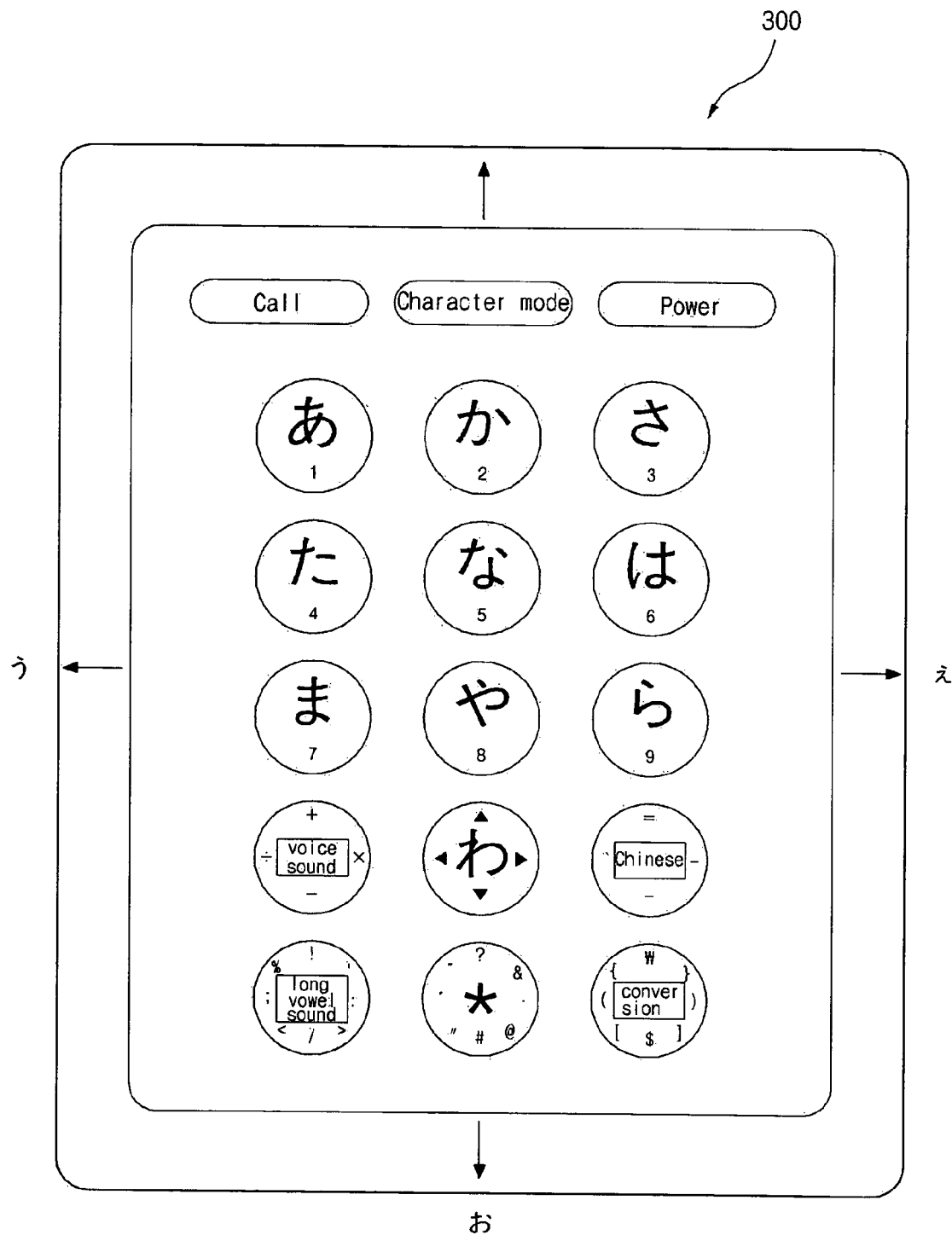
FIG. 8 illustrates a Japanese alphabet keypad for use with an apparatus for inputting characters/numerals to a display of a mobile communication terminal according to the present invention.

Consonants and vowels of a language such as Korean, Roman, Japanese and Chinese, numerals, and functional keys are allocated to the buttons on the keypad 10 and in the sliding directions (please refer to FIG. 4, FIG. 6, and FIG. 8). When the user presses buttons of desired characters/numerals or slides the keypad along its sliding directions with respect to the center of the main body 1 of the terminal, a key signal is generated according to the operation.

Consonants and vowels of each language such as Korean, Roman and Japanese are allocated to the buttons on the keypad 10 and in the sliding directions in the following manner. In case of the Korean alphabet keypad 100 consonants are written on each of the buttons, and vowels are allocated in the sliding directions of the keypad 10. In case of the Roman alphabet keypad 200 each button on the keypad 10 is assigned with two different alphabets in consecutive order, and the consonants and vowels of the Roman alphabet are also allocated in the sliding directions of the keypad 10. In case of the Japanese alphabet keypad 300 あs are written on the buttons in each row, and い,う,え,お and other special characters and functional keys are allocated in the sliding directions of the keypad 10.

As such, when the user inputs a character and numeral once, a total of 128 input signals can be sensed. This means that the keypad 10 used in the mobile communication terminal, although it has a small number of buttons, can generate the same level of character input rate and accuracy with the typical computer keyboard. For instance, in the case of the Korean alphabet keypad (please refer to FIG. 4), a total of 128 letters can be inputted by using a single consonant allocated to a certain button and vowels allocated in the sliding directions of the keypad 10. This input system is almost impossible for the typical keypad to realize.

A button-operation recognition unit 20 detects a key operating state of each button mounted on the keypad 10, and outputs the key operating state to a microprocessor 70.

A keypad sliding recognition unit 30 detects a key operating state according to the sliding of the keypad 10 in at least four directions, and outputs the key operating state to the microprocessor 70.

To be able to sense the sliding motion of the keypad 10, the afore-mentioned keypad sliding recognition unit 30 is fitted inside the groove 5 formed in the main body 1 of the terminal where the keypad 10 is inserted. The position of the keypad sliding recognition unit 30 can be varied according to the sliding mechanism of the keypad 10.

A character storage 40 stores characters of different languages including Korean (such as, a complete syllable), Roman and Japanese, numerals and codes (symbols), and special characters. Under the control of the microprocessor 70, the character storage 40 outputs characters of a corresponding language.

A program memory 50 stores an operating program for the microprocessor 70.

A code storage 60 stores code data corresponding to the buttons on the keypad 10 and the sliding directions of the keypad 10.

When a key operating state detection signal is inputted through the button-operation recognition unit 20 and/or the keypad sliding recognition unit 30, the microprocessor 70, according to the operating program stored in the program memory 50, decides by referring to the character data stored in the character storage 40 which phoneme in what language is inputted by the user, and generates by referring to the code data stored in the code storage 60 a display control signal for displaying the phoneme of the corresponding language the user inputted.

A display driving unit 80, under the display control signal outputted form the microprocessor 70, outputs to a display 90 a driving control signal for displaying a character or numeral the user inputted by pressing a button on the keypad 10 or sliding the keypad 10.

Typically an LCD is used for the display 90. The display 90 displays characters and numerals according to the driving control signal outputted from the display driving unit 80 so that the user can check the characters/numerals he inputted by himself.

Figure 5:
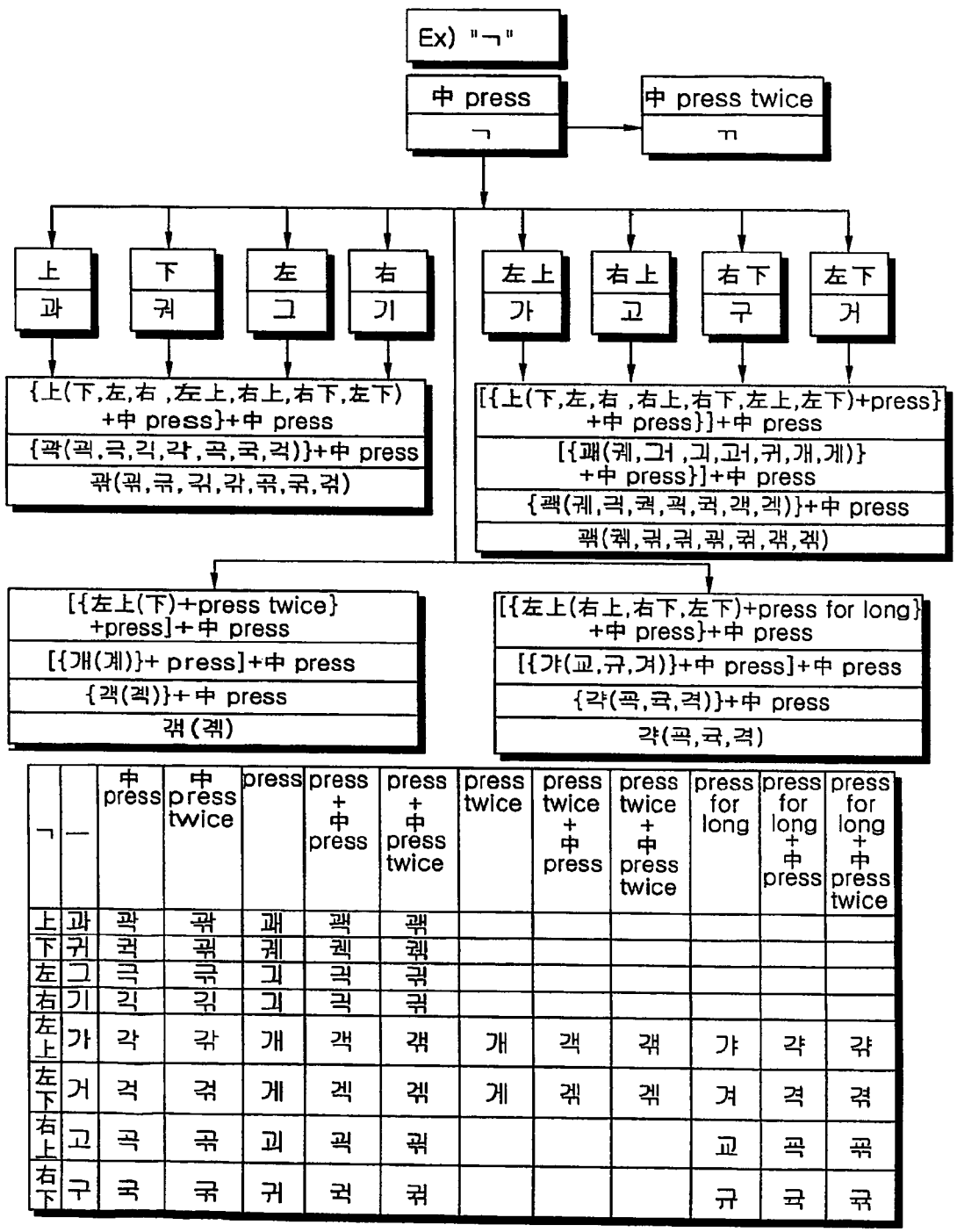
FIG. 5 diagrammatically illustrates a conversion example of consonants/vowels of Korean alphabet and examples of syllables (combination of consonants and vowels) that embody a method for inputting characters/numerals to a Korean alphabet keypad according to the present invention.

FIG. 4 illustrates a Korean alphabet keypad for use with the apparatus for inputting characters/numerals to a display of the mobile communication terminal according to the present invention; and FIG. 5 diagrammatically illustrates a conversion example of consonants/vowels of Korean alphabet and examples of syllables (combination of consonants/vowels), particularly all kinds of Korean input method using the button with 'ㄱ'embodying the method for inputting characters/numerals to the Korean alphabet keypad according to the present invention (in the table in the bottom, '-' means to operate the keypad 10 while pressing a button, and '누름' (press) means to slide the keypad 10 in a desired direction without pressing a button but simply by using the frictional force of the hand and then press the button).

As shown FIG. 4, the Korean alphabet keypad 100 includes a plurality of (6 rows and 3 lines) buttons including functional keys such as call, message mode, and power. Preferably, the buttons in the first row is allocated to the functional keys such as call, message mode, and power, and the buttons from the second row to the sixth row of the first line to the third line are allocated to Korean consonants. The sliding directions of the keypad 10 (here, eight directions including upper left, upward, upper right, left, lower left, right, downward, and lower right) are allocated to vowels of Korean such as ㅏ, ㅑ, ㅗ, ㅡ, ㅣ, ㅜ, ㅕ, and ㅓ.

Other vowels except for those eight vowels in the sliding directions of the keypad 10 are available by pressing a corresponding key once, twice or longer, and sliding the keypad 10 first.

That is to say, when the user presses the button of 'ㄱ'on the keypad 10 and slides the keypad 10 in the lower right direction while pressing the 'ㄱ'button, 'ㄱ'is combined with a vowel 'ㅓ'that is originally allocated in the lower right direction, so a letter '거'is displayed. Further, if the user presses the 'ㄱ'button again without removing his hand from the keypad 10 slid in the lower right direction, a vowel 'ㅣ'is newly added to the letter '거', thereby creating a letter '게'. If the user presses the 'ㄱ'button one more time in the present state, 'ㅔ'is converted to 'ㅖ'. As a result, a letter '계' is displaced instead of the letter '게'. In this manner, a consonant can be combined with other vowels besides those 8 basic vowels.

Meanwhile, after pressing the 'ㄱ'button and sliding the keypad 10 in the lower right direction while pressing the button, the user might press the button for long, the vowel 'ㅓ' is converted to 'ㅕ', whereby a letter '겨' is displayed instead of '거'. Alternatively, it is also possible to slide the keypad 10 first and then press a corresponding button. This method will be described later To write the 'ㄲ' user simply needs to press the 'ㄱ' button twice without sliding the keypad 10. Also, to write ퟋ the user needs to press the 'ㄹ' and the 'ㅂ' button next.

The following will now describe combination rules of consonants and the rest of vowels except the 8 vowels.

1. To combine a consonant with vowels of ㅏ, ㅓ, ㅗ, ㅠ, ㅒ, ㅖ and ㅢ', the user first vowels of ㅏ, ㅓ, ㅗ, ㅜ, ㅐ, ㅔ, — and ㅣ' and presses a corresponding consonant button. In other words, if a vowel out of 'ㅘ, ㅝ, — and ㅣ' is inputted first and a consonant next,' the consonant is combined with a vowel out of ㅏ, ㅓ, ㅗ, ㅠ, ㅒ, ㅖ and ㅢ'. For example, to write '가져요' the user presses buttons on the keypad 10 in order of 'ㅏ, ㄱ, ㅓ, ㄱ, ㅗ, ㄱ' or slides the keypad 10 in the directions where the corresponding vowels are allocated.

2. To combine a consonant with other vowels except for 'ㅒ, ㅖ and ㅢ', the user first presses the consonant button and operates a corresponding vowel. For example, to write '가즈', the user presses buttons on the keypad 10 in order of 'ㄱ, ㅏ, ㄱ, ㅓ, ㄱ, ㅗ' or sliding the keypad 10 in the directions where the corresponding vowels are allocated.

3. To write diphthongs ㅒ, ㅖ, ㅘ, ㅝ, ㅐ, and ㅔ' the user operates a corresponding vowel out of 'ㅏ, ㅓ, ㅗ, ㅜ, ㅐ and ㅔ' and then presses a consonant button one more time. For example, to write '개계쾌', the user presses buttons on the keypad 10 in order of 'ㄱ, ㅏ, ㄱ, ㄱ ㅓ,ㄱ , ㄱ, ㅗ, ㄱ', or slides the keypad 10 in the directions where the corresponding vowels are allocated.

4. If the user presses a consonant button and operates a vowel after the keypad 10 returns to its original position, only the consonant will be displayed. On the other hand, if the user operates a vowel without pressing any consonant button beforehand and does not press a consonant button next either, no letter will be displayed.

5. If a consonant to be combined with a vowel is a fortis out of ㄲ, ㄸ, ㅃ, ㅆ and ㅉ', or a consonant on the right hand side of a button (for example, if 'ㅇ' and 'ㅎ' are written on the same button, 'ㅎ' is the consonant on the right hand side), the user presses a corresponding consonant button for long.

6. No vowel can be outputted unless a consonant button is first operated. Also, no diphthong such as ㅒ, ㅖ, ㅘ, ㅝ, ㅐ, and ㅔ' can be outputted unless a vowel is first operated.

7. The output of a syllable is achieved if and only if a first phoneme signal is kept. When the user takes his finger off a consonant button to output a diphthong or a fortis, the vowel operation should be maintained to output a syllable.

8. A right hand side consonant (given that two consonants are allocated to the same button) is outputted by pressing a corresponding button for long.

9. A fortis is outputted by pressing a button for long.

10. To output a vowel in a diagonal direction of the keypad 10, the switches on both sides of the diagonal direction should be pressed together for at least 0.1 second. Otherwise, the vowel is recognized in another direction.

In case that the user wants to input numerals or symbols besides characters by using the Korean alphabet keypad 100, the user needs to slide the keypad 10 in the downward direction while pressing the call button on the first line in the first row to set up a numeral mode or a symbol mode, and inputs a desired numeral or simple (this method is also applicable in the Roman and Japanese alphabet modes).

For instance, to input a number '1' the user needs to slide the keypad 10 in the downward direction while pressing the call button, and press the button with '1'. To input a question mark '?', on the other hand, the user needs to press the button in the fourth row of the second line and slide the keypad 10 in the upward direction while pressing the button.

If the user wants to input the numerals and symbols written on the button in the sixth row of the second line on the Korean alphabet keypad 100 (which corresponds to the buttons in the sixth row of the second line and the sixth row of the third line on the Roman alphabet keypad 200, respectively, and the buttons in the fifth row of the first line, the fifth row of the third line, and the sixth row of the first to third lines on the Japanese alphabet keypad 300, respectively), there is no need to set up the numeral and symbol mode by sliding the keypad 10 in the downward direction. For example, suppose that the user wants to input '+' on the Korean alphabet keypad 100. What the user needs to do is to slide the keypad 10 in the downward direction while pressing the call button, press the button in the fifth row of the first line, and slide the keypad 10 in the upward direction while pressing on the corresponding button with '+'. For another example, if the user wants to input '&', he simply needs to press the button in the sixth row of the second line and slide the keypad 10 in the upper right direction. Meanwhile, in case of the Japanese alphabet keypad 300, to input numerals or to operate directional keys the user first needs to press the call button, slide the keypad 10 in the downward direction while pressing the call button, set up the numeral/symbol mode and inputs a desired numeral. To input a symbol, the user does not need to set up the mode but directly input the symbol.

If the user wants to change the direction of the cursor shown on the character input display 90 the button in the fifth row of the second line is used. For example, suppose after the user pressed the call button and slid the keypad 10 in the downward direction while pressing the call button, he presses the button in the fifth row of the second line and slides the keypad 10 in the right direction while pressing the button. Then the cursor on the display 90 moves in the right direction. To move the cursor to a desired position, the user needs to keep pressing the button until the cursor reaches to the position.

Symbols are carefully arranged for user's convenience. When setting the numeral and symbol mode of each language, it is preferable to allocate frequently used symbols to a button the user can directly input a desired numeral or a symbol without setting the corresponding mode.

As described above, unlike the related art Korean character input method, only the consonants are written on the buttons and the vowels are allocated in the sliding directions of the keypad 10. Thus, to combine a consonant with a vowel, the user simply presses a corresponding button and slides the keypad 10 in a desired direction while pressing the button. In this manner, the frequency of inputting letters is much reduced and the user's convenience can be considerably improved. To add a stroke to the vowels in the 8 sliding directions of the keypad 10, the user simply presses the button he has been pressing one more time. There are only three kinds of principles or rules for the combination of consonants and vowels. Therefore, compared with the existing method, the input method of the present invention is much easier to learn within a short amount of time. For instance, the order of Korean consonants arranged on the buttons is the same order found in a dictionary so that any one can easily use the keypad 10 without spending extra time to learn the arrangement of the letters on the keypad 10.

Also, according to the Korean inputting rules of the present invention, the input rate is about 50% faster than the frequency of inputting letters/symbols/numerals through more than 100 keys of the typical computer keyboard. Provided that the user is pretty well accustomed to the present invention keypad and uses both hands, the character input rate will become even faster with the aid of a small number of buttons on the miniature keypad for use in the communication.

Figure 7:
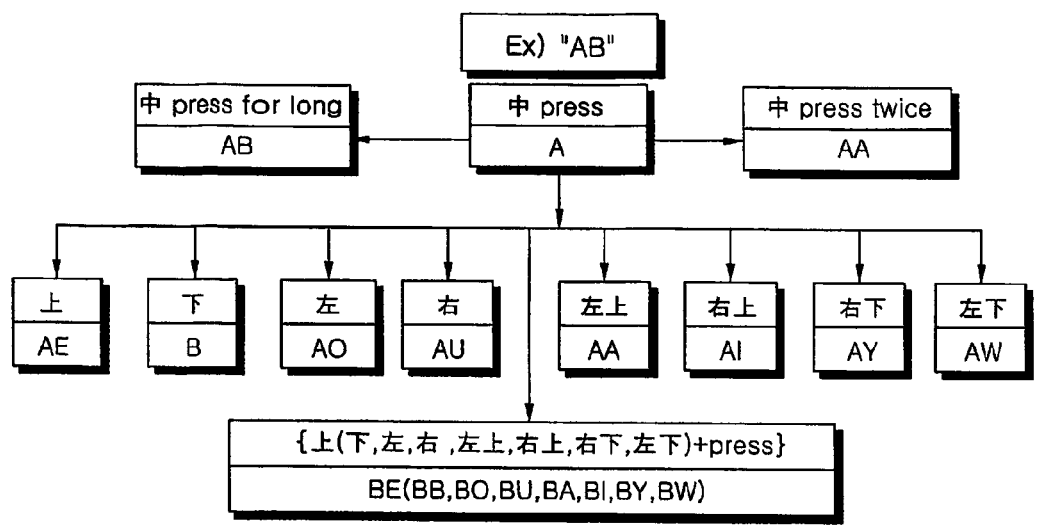
FIG. 7 diagrammatically illustrates a conversion example of consonants/vowels of Roman alphabet and examples of syllables (combination of consonants and vowels) that embody a method for inputting characters/numerals to a Roman alphabet keypad according to the present invention.

FIG. 6 illustrates the Roman alphabet keypad 200 for use with an apparatus for inputting characters/numerals to a display of a mobile communication terminal according to the present invention; and FIG. 7 diagrammatically illustrates a conversion example of consonants/vowels of Roman alphabet and examples of syllables (combination of consonants and vowels) particularly all kinds of Roman input method using the button with 'AB', embodying the method for inputting characters/numerals to the Roman alphabet keypad according to the present invention (in the table in the bottom, '-' means to operate the keypad 10 while pressing a button, and '누름'(press) means to slide the keypad 10 in a desired direction without pressing a button but simply by using the frictional force of the hand and then press the button).

As shown FIG. 6, the Roman alphabet keypad 200 includes a plurality of (6 rows and 3 lines) buttons including functional keys such as call, message mode, and power. Preferably, the buttons in the first row is allocated to the functional keys such as call, message mode, and power, and a total of 13 buttons from the second row to the sixth row of the first line to the third line except for the last two buttons are allocated to Roman alphabet, two alphabets on each button.

The sliding directions of the keypad 10 (here, seven directions including upper left, upward, upper right, left, right, lower left and lower right) are allocated to vowels such as 'a, e, i, o, u, w, and y', and a downward slide of the keypad 10 is used for inputting an alphabet on the right hand side on each button. That is to say, the alphabets on the left hand side of the buttons on the keypad 10 can be inputted by pressing a desired button, and the alphabets on the right hand side of the buttons can be inputted by pressing a desired button and sliding the keypad 10 in the downward direction while pressing the button.

More specifically speaking, when the user wants to input 'AA' for example, he needs to press the button in the second row of the first line and slide the keypad 10 in the upper left direction while pressing the button. Also, to input 'BA' the user first slides the keypad 10 in the upper left direction by using the frictional force of his hand, and then presses the button in the second row of the first line.

As for inputting 'BA', since the button in the second row of the first line is pressed once after the keypad 10 is slid first in the upper left direction by the user, the frequency of inputting the letters is practically one.

The following will now describe the rules for writing words by using the Roman alphabet keypad 200.

1. To combine alphabets on the right hand side of each of the buttons with the vowels allocated in the sliding directions of the keypad 10, the user first operates the vowels 'a, e, i, o, u, w, and y' and then presses the button with a desired alphabet on the right hand side. In other words, when an operating signal of a vowel among 'a, e, i, o, u, w, and y' is inputted without a button signal, the inputted vowel is combined with a following right hand side-alphabet on a button. For example, to output 'babebi' the user operates in order of 'a, b, e, b, i, and b'.

2. To combine alphabets on the right hand side of each of the buttons with the vowels allocated in the sliding directions of the keypad 10, the user first operates a desired button and slides the keypad 10 in a corresponding direction. For example, to output 'caceci' the user operates in order of 'c, a, c, e, c, and i'.

3. If the keypad 10 having been slid in a direction such as in the upward, downward, left, right or diagonal direction while the user pressed a button on the keypad 10 returns to its original position, and the user then operates a vowel, only an alphabet on the right hand side of the corresponding button is displayed. If the user slides the keypad 10 in its sliding direction to operate a vowel without having pressed any button beforehand, no letter will be outputted unless the user presses a button after operating the vowel.

4. No vowel allocated in the sliding directions of the keypad 10 would be outputted unless any button is operated before or after.

5. The combination of a syllable (alphabets written on the buttons and the vowels allocated in the sliding directions of the keypad 10) can be completed if and only if the signal of a first phoneme is maintained.

6. An alphabet on the right hand side of each of the buttons is outputted by pressing a corresponding button and sliding the keypad 10 in the downward direction.

7. The output of alphabets in the diagonal direction of the keypad 10 is possible when the switches on both sides of a corresponding diagonal direction are pressed down simultaneously for at least 0.1 second.

Therefore, two Roman alphabets as in the Korean alphabet input method can be inputted by pressing a button once. However, all Roman alphabets, by its nature, cannot be inputted in such a manner. For instance, if two consonants need to be inputted consecutively, the user inputs one consonant at a time. Even then the input rate of the Roman alphabets is faster than that of the existing mobile communication terminal. To convert a capital letter to a small letter, all the user needs to do is to press the conversion button in the sixth row of the third line, and press a corresponding alphabet.

As such, the character input rate of the Roman alphabet keypad 200 according to the present invention is much faster than that of the existing mobile communication terminal. Without selecting an additional alphabet word the user is able to input 2 alphabets maximum by pressing a button once.

Figure 9:
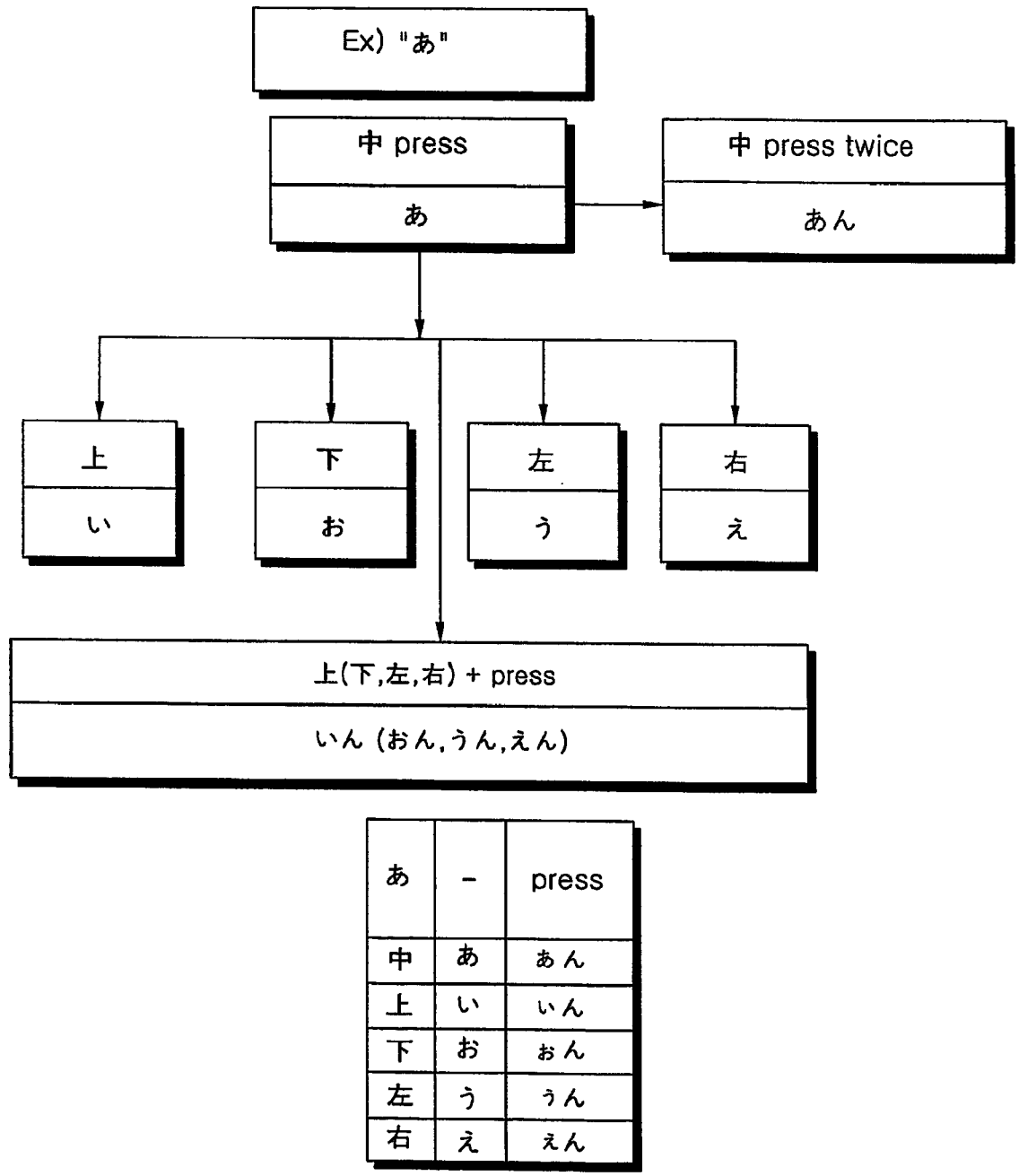
FIG. 9 diagrammatically illustrates a conversion example of consonants/vowels of Japanese alphabet and examples of syllables (combination of consonants and vowels) that embody a method for inputting characters/numerals to a Japanese alphabet keypad according to the present invention.
Figure 10:
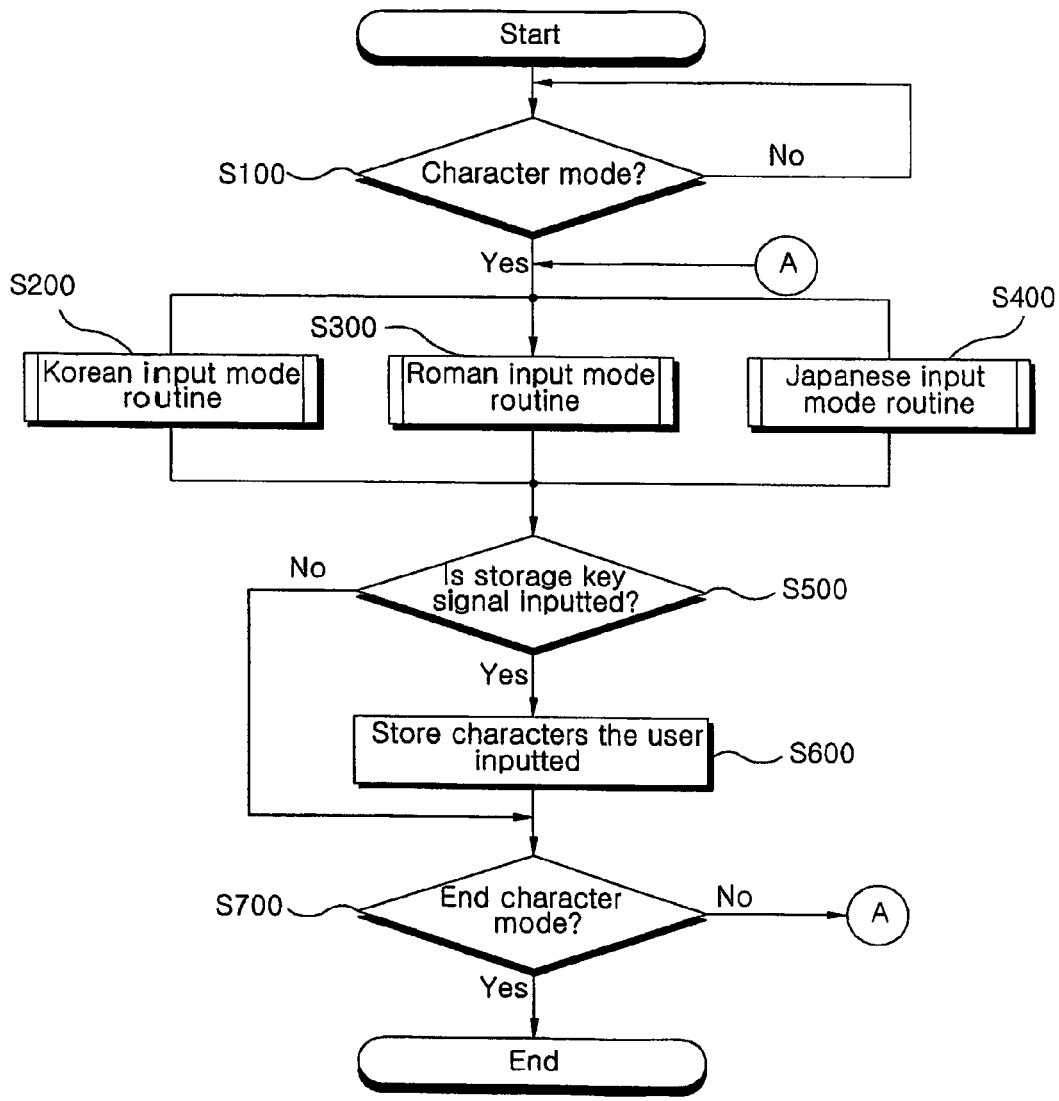
FIG. 10 is a flow chart describing a method (or procedure) for inputting characters/numerals to a display of a mobile communication terminal according to the present invention.
Figure 11:
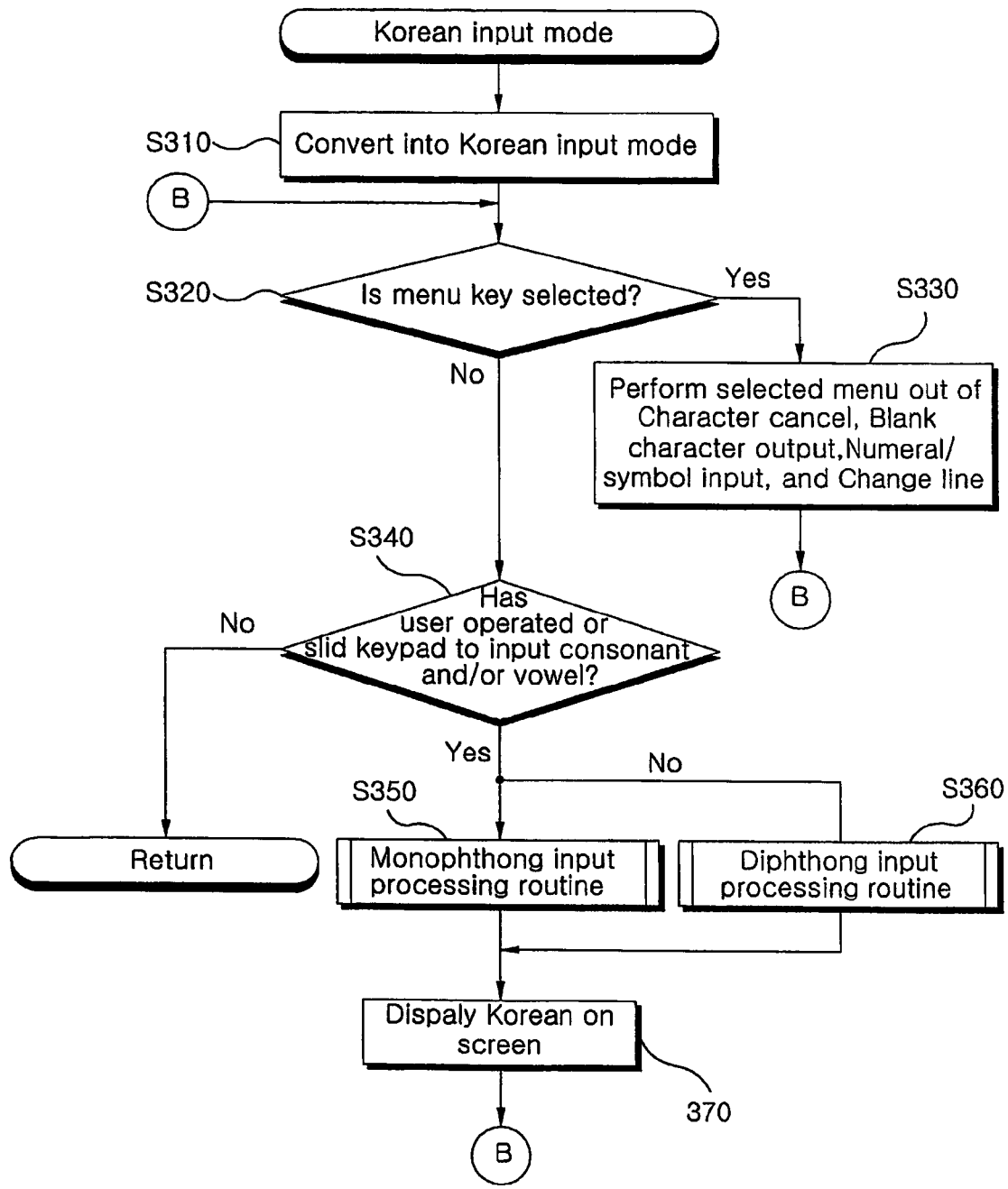
FIG. 11 is a flow chart describing in detail a method for inputting characters/numerals in Korean input mode of FIG. 10.

FIG. 8 illustrates the Japanese alphabet keypad 300 for use with an apparatus for inputting characters/numerals to a display of a mobile communication terminal according to the present invention; and FIG. 9 diagrammatically illustrates a conversion example of consonants/vowels of Japanese alphabet and examples of syllables (combination of consonants and vowels) particularly all kinds of Japanese input method using the button with あ', embodying the method for inputting characters/numerals to the Japanese alphabet keypad according to the present invention (in the table in the bottom, '-' means to operate the keypad 10 while pressing a button, and '누름'(press) means to slide the keypad 10 in a desired direction without pressing a button but simply by using the frictional force of the hand and then press the button).

As shown FIG. 8, the Japanese alphabet keypad 300 includes a plurality of (6 rows and 3 lines) buttons including functional keys such as call, message mode, and power. Preferably, the buttons in the first row is allocated to the functional keys such as call, message mode, and power, and a total of 10 buttons from the second row to the fifth row of the first line to the third line except for the last button are allocated to あs of Japanese alphabet (Hiragana).

The sliding directions of the keypad 10 (here, four directions including upward, downward, left and right) are allocated to い, う, え, and お.

For example, if the user wants to input 'け'he needs to press the button in the third row of third line. Also, to input 'め'he can slide the keypad 10 by using the frictional force of his hand in the right direction without pressing the button 'ま'in the fourth row of the first line.

To input 'ん' the user needs to press a corresponding button on the keypad 10 one more time. Meanwhile, to input 'っ' the user slides the keypad 10 in the left direction (where ゔis allocated) by using the frictional force of his hand and presses the button with 'た' for long.

Also, to input a semivowel among 'や,ゆ, and よ' the user presses the button with 'や' or slides the keypad 10 in the left or downward direction while pressing the button with 'や' inputs 'や,ゆ, and よ', and then presses a corresponding button for long. To input a voice sound the user inputs a letter of 'か, さ, た and は' in each row, and presses the button in the fifth row of the first line.

In the case of semi-voiced sounds, the user first needs to input a character in the row of 'は' and then press a corresponding button for long. In the case of long vowel sounds, '—'for example, the user inputs a desired letter and then presses the button in the sixth row of the first line.

Meanwhile, the conversion between Hiragana and Katakana takes place by operating the conversion button in the sixth row of the third line. That is to say, if the user wants to change Hiragana into Katakana, he first inputs a desired character, presses the conversion button and lastly selects the Katakana mode displayed on the display 90.

To express 'f' sound in Japanese, such as 'ア, イ, ウ and オ' marked after the 'ア', the user inputs a character in the row of 'ア'and presses a corresponding button for long.

To input Japanese combined with Chinese, the user needs to press the Chinese button in the fifth row of the third line and inputs Hiragana. Then the Japanese combined with Chinese stored in the character storage 40 of the mobile communication terminal will be retrieved and displayed on the display 90.

In the typical input system of a mobile communication system a plurality of languages (more than 2) are assigned to one keypad. The present invention keypad, however, conveys one language.

Referring to FIGS. 10 to 17, the following will now explain the method for inputting characters/numerals to a display of a mobile communication terminal according to the present invention.

FIGS. 10 to 17 are flow charts describing in detail the method for inputting characters/numerals to a display of the mobile communication terminal.

The microprocessor 70 of the mobile communication terminal 1 decides whether the user selected a character mode of a language by pressing the character mode button on the keypad 10 (S100). If the user selected the character mode of a language, the microprocessor 70 decides which language among Korean, Roman and Japanese is selected (S200).

For example, suppose the Korean input mode, the Roman input mode, the Japanese input mode, and the character storage mode are set up in the sliding direction of the keypad 10. If the user presses the character mode key and slides the keypad 10 in the upward direction, the microprocessor 70 decides that the user selected the Korean input mode. Likewise, if the keypad 10 is slid in the downward direction, the microprocessor 70 decides that the user selected the Roman input mode. Also, if the keypad 10 is slid in the left direction, the microprocessor 70 decides that the user selected the Japanese input mode. Lastly, if the keypad 10 is slid in the right direction, the microprocessor 70 decides that the user selected the character storage mode.

If it turns out that the user selected the Korean input mode for example, the microprocessor 70 detects a key signal inputted from the button-operation recognition unit 20 and/or the keypad sliding recognition unit 30 in accordance with the operation of a plurality of buttons on the keypad 10 or the sliding operation of the keypad 10 in the upward, downward, left, right and diagonal directions, combines Korean consonant and vowels and numerals/symbols, and displays the result on the display 90 (S300).

More specifically speaking, if the user selects the Korean input mode the microprocessor 70 of the mobile communication terminal 1 is converted into the Korean input mode and maintains a Korean input standby state (S310). In this state the microprocessor 70 decides whether the user presses a menu key (e.g., the 'call' key on the keypad 10) and then to which direction (e.g., the upward, downward, left or right directions) the keypad 10 is slid, each directing being designated as the character cancel, the blank character output, the numeral and symbol input, and the line change menu (S320).

If it turns out that the user selected a menu key, the microprocessor 70 performs a corresponding menu selected out of the character cancel, the blank character output, the numeral and symbol input, and the line change menu (S330).

However, if it turns out that the user did not select any menu key (S320), that is, if the user did not select one of menu keys out of the character cancel, the blank character output, the numeral and symbol input, and the line change menu, the microprocessor 70 decides whether the user inputs Korean consonants and vowels by pressing the buttons on the keypad 10 and/or sliding the keypad 10 in the upward, downward, left, right and diagonal directions (S340).

If it turns out that the user inputted Korean consonants and vowels by pressing the buttons on the keypad 10 and/or sliding the keypad 10 in the upward, downward, left, right and diagonal directions, the microprocessor 70 checks, on the basis of an input key signal from the button-operation recognition unit 20 and/or the keypad sliding recognition unit 30, the input of the consonants and monophthongs (S350).

Moreover, the microprocessor 70 checks, on the basis of an input key signal from the button-operation recognition unit 20 and/or the keypad sliding recognition unit 30, the input of the consonants and diphthongs (S360).

Later the microprocessor 70 displays on the display 90 Korean words the user inputted, and repeats the steps after S320 (S370).

Figure 12:
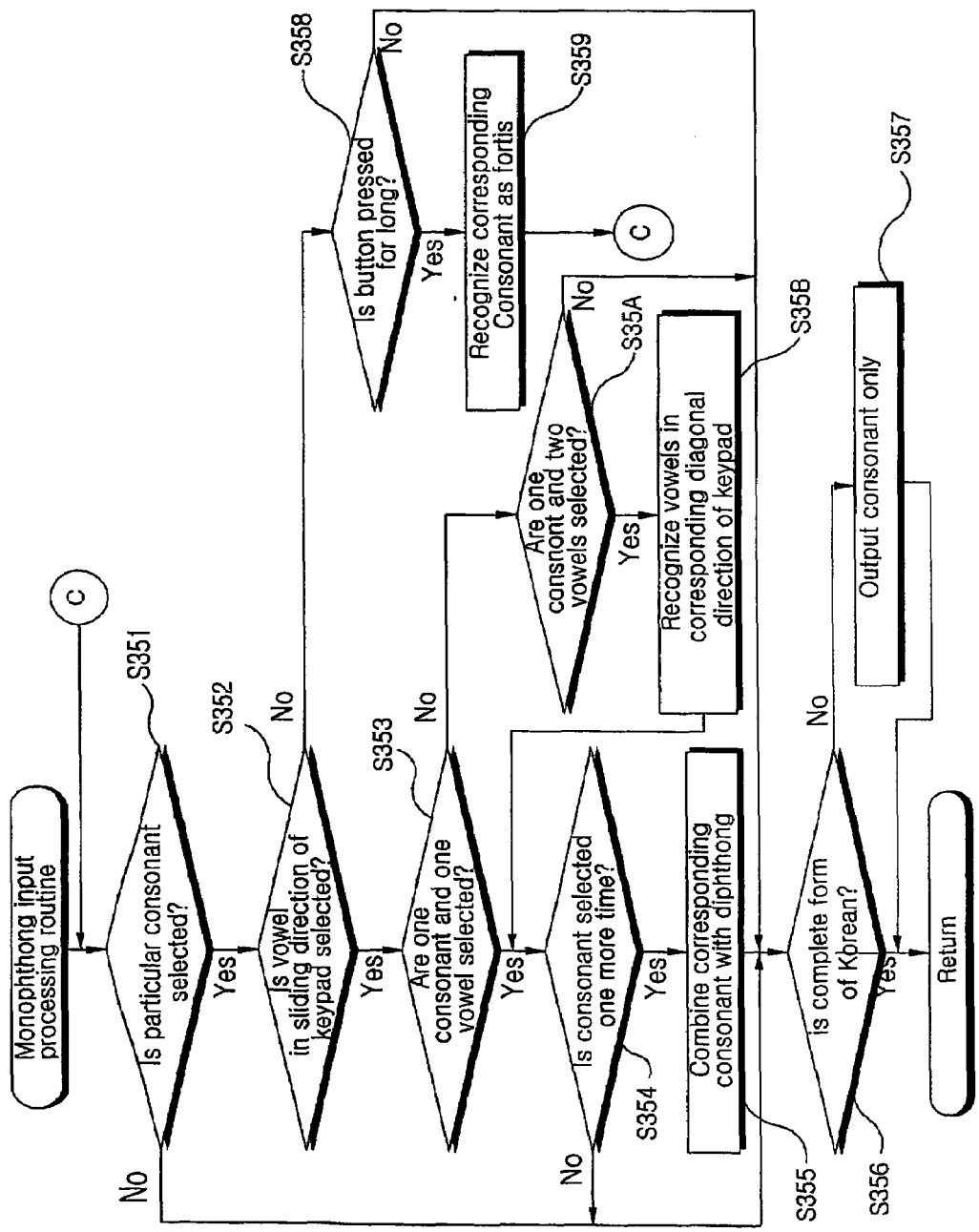
FIG. 12 and FIG. 13 are flow charts describing in detail, respectively, the input of monophthong and diphthong in Korean input mode of FIG. 11.

More details on the monophthong input process in step 350 will now be provided below, referring to FIG. 12.

The microprocessor 70 decides whether a (Korean alphabet) button on the keypad 10 is pressed down by the user (S351), and if a button is being pressed down the microprocessor 70 decides whether the keypad 10 is slid in any direction and a certain vowel along the direction is selected (S352).

If the user selected a vowel by sliding the keypad 10, the microprocessor 70 decides whether the user selected one consonant and one vowel (S353). If so, the microprocessor 70 decides whether the user selects the consonant button again (S354).

If the consonant button was selected again, the microprocessor 70 combines the corresponding consonant and a diphthong (S355). The microprocessor 70 also decides whether the Korean letter the user inputted is a complete form of Korean and if so, it goes to the step 370 to display the letter on the display (S354).

However, if the resulting Korean letter is not a complete form of Korean, the microprocessor 70 outputs the corresponding consonant only (assuming that the user has inputted the consonant only), and performs the step 370 (S357).

Also, if the user did not slide the keypad 10 in any direction, the microprocessor 70 finds out if the user has been pressing the button for long (S358). If it turns out that the user pressed the button for long, the microprocessor 70 recognizes the corresponding consonant as a fortis and performs the steps after S351 (S359).

If the user did not select one consonant and one vowel, the microprocessor 70 decides whether the user selected one consonant and two vowels by sliding the keypad 10 (S35A). If this is the case, the microprocessor 70 recognizes them as the vowels that are allocated to a corresponding diagonal direction of the keypad 10 (S35B), and performs the steps after S354. On the other hand, if it turns out that one consonant and two vowels were not selected, the steps after S356 are performed repeatedly.

Figure 13:
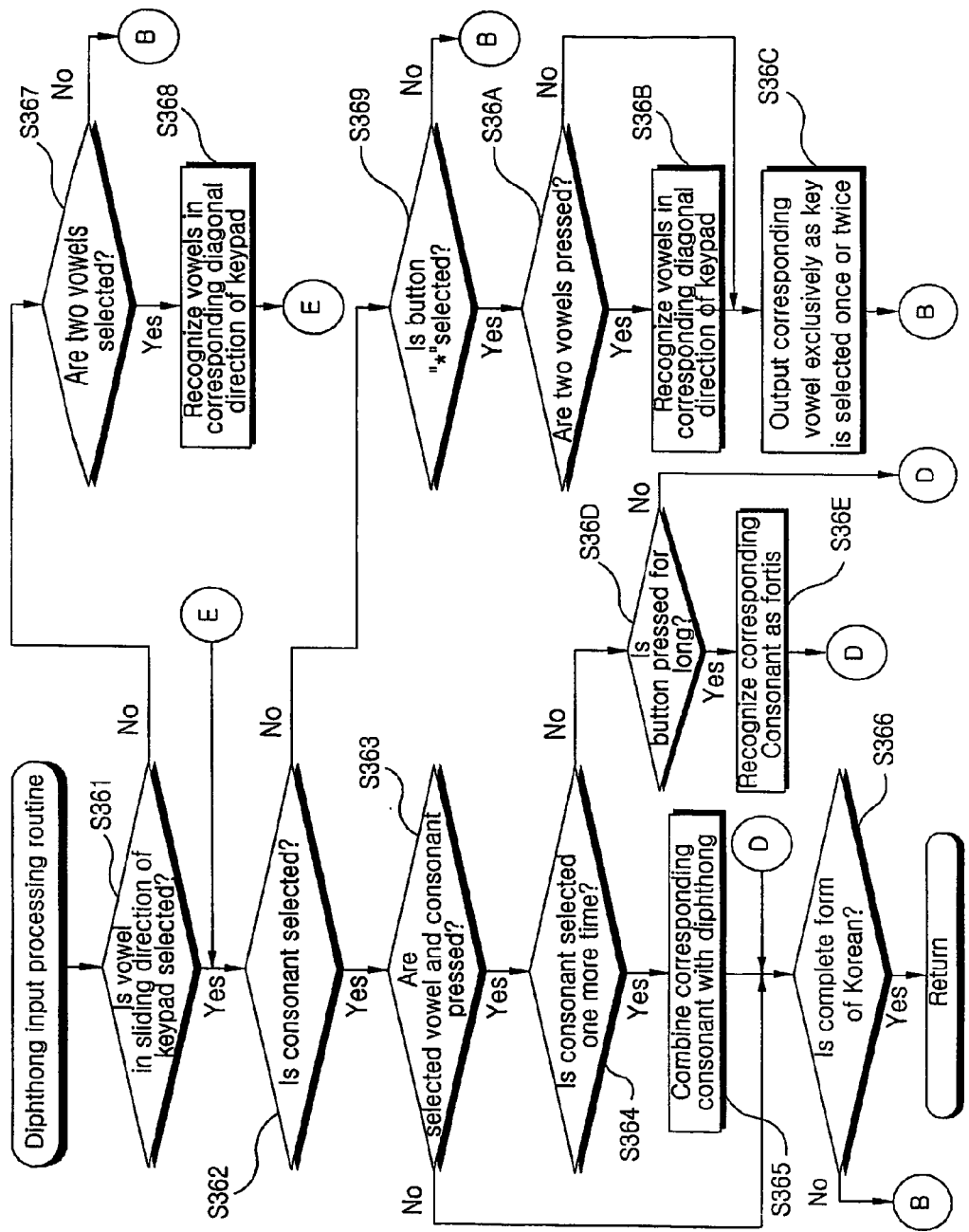
Figure 14:
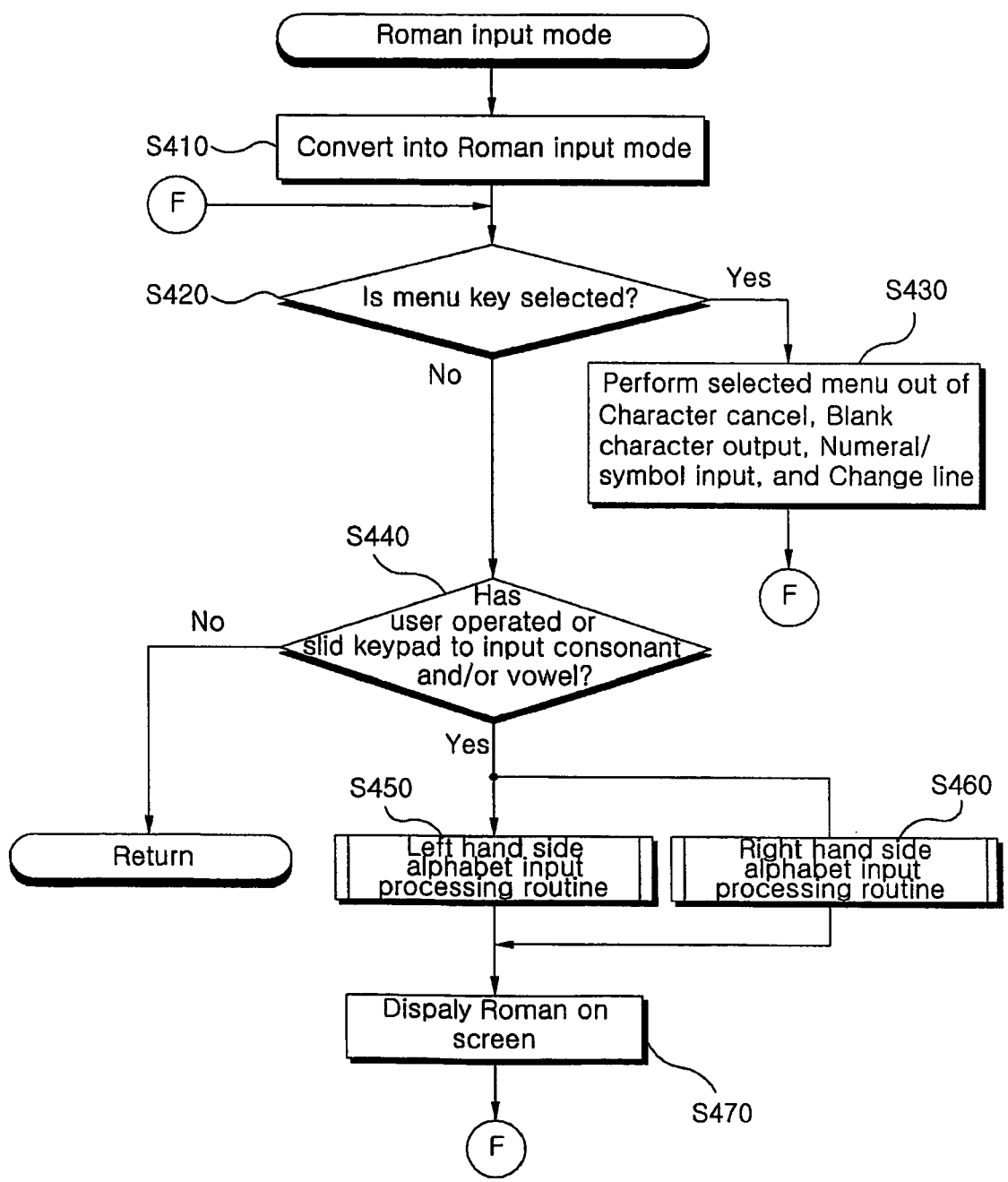
FIG. 14 is a flow chart describing in detail a method for inputting characters/numerals in Roman input mode of FIG. 10.

More details on the diphthong input process in step 360 will now be provided below, referring to FIG. 13.

The microprocessor 70 decides if the user slid the keypad 10 by using the frictional force of his hand while no button on the keypad 10 was being pressed (S361). And if a certain vowel was selected in this manner the microprocessor 70 decides whether the user pressed a certain button on the keypad 10 to input a consonant (S362).

If it turns out that the user operated a certain consonant button on the keypad 10, the microprocessor 70 decides in steps of 361 and 362 whether the vowel and the consonant the user selected are being pressed (S363). If so, the microprocessor 70 decides whether the consonant button is being selected one more time (S364).

If the consonant button was selected one more time, the microprocessor 70 combines the corresponding consonant and a diphthong (S365). The microprocessor 70 also decides whether the Korean letter the user inputted is a complete form of Korean and if so, it repeats the steps after S320 (S366).

However, if a vowel was not selected by the user in step 361, the microprocessor 70 decides whether the user selected two vowels instead of one by sliding the keypad 10 (S367). If it turns out that the user indeed selected two vowels by sliding the keypad 10, the microprocessor 70 recognizes them as the vowels in a corresponding diagonal direction of the keypad 10, and performs the steps after S362 (S368).

Also, if it turns out that the consonant was not selected, the microprocessor 70 decides whether the user selected a '*' button (S369) and if so, it decides whether two vowels are being pressed down (S36A).

If it turns out that two vowels are being pressed down, the microprocessor 70 recognizes them as the vowels allocated in a corresponding diagonal direction of the keypad 10 (S36B), and outputs the corresponding vowel exclusively according to whether the '*' button was pressed once or twice, and performs the steps after S320 (S36C).

If it turns out in step 364 that the particular button on the keypad 10 was not selected one more time, the microprocessor 70 decides whether the user pressed the button for long (S36D) and if so, it recognizes the corresponding consonant as a fortis and performs the steps after S366 (S36D).

On the other hand, if in step 200 the user selected the Roman input mode, the microprocessor 70 detects a key signal inputted from the button-operation recognition unit 20 and/or the keypad sliding recognition unit 30 in accordance with the operation of a plurality of buttons on the keypad 10 or the sliding operation of the keypad 10 in the upward, downward, left, right and diagonal directions, combines consonant and vowels and numerals/symbols, and displays the result on the display 90 (S400).

More specifically speaking, if the user selects the Roman input mode the microprocessor 70 of the mobile communication terminal 1 is converted into the Roman input mode and maintains a Roman input standby state (S410). In this state the microprocessor 70 decides whether the user presses a menu key (e.g., the 'call' key on the keypad 10) and then to which direction (e.g., the upward, downward, left or right directions) the keypad 10 is slid, each directing being designated as the character cancel, the blank character output, the numeral and symbol input, and the line change menu (S420).

If it turns out that the user selected a menu key, the microprocessor 70 performs a corresponding menu selected out of the character cancel, the blank character output, the numeral and symbol input, and the line change menu (S430).

However, if it turns out that the user did not select any menu key (S420), that is, if the user did not select one of menu keys out of the character cancel, the blank character output, the numeral and symbol input, and the line change menu, the microprocessor 70 decides whether the user inputs Roman consonants and vowels by pressing the buttons on the keypad 10 and/or sliding the keypad 10 in the upward, downward, left, right and diagonal directions (S440).

If it turns out that the user inputted Roman consonants and vowels by pressing the buttons on the keypad 10 and/or sliding the keypad 10 in the upward, downward, left, right and diagonal directions, the microprocessor 70 checks, on the basis of an input key signal from the button-operation recognition unit 20 and/or the keypad sliding recognition unit 30, the input of the consonants on the left hand side of the buttons and the consonants and vowels allocated in the sliding directions of the keypad 10 (S450).

Moreover, the microprocessor 70 checks, on the basis of an input key signal from the button-operation recognition unit 20 and/or the keypad sliding recognition unit 30, the input of the consonants on the right hand side of the buttons and the consonants and vowels allocated in the sliding directions of the keypad 10 (S460).

Later the microprocessor 70 displays on the display 90 Roman words the user inputted, and repeats the steps after S420 (S470).

Figure 15:
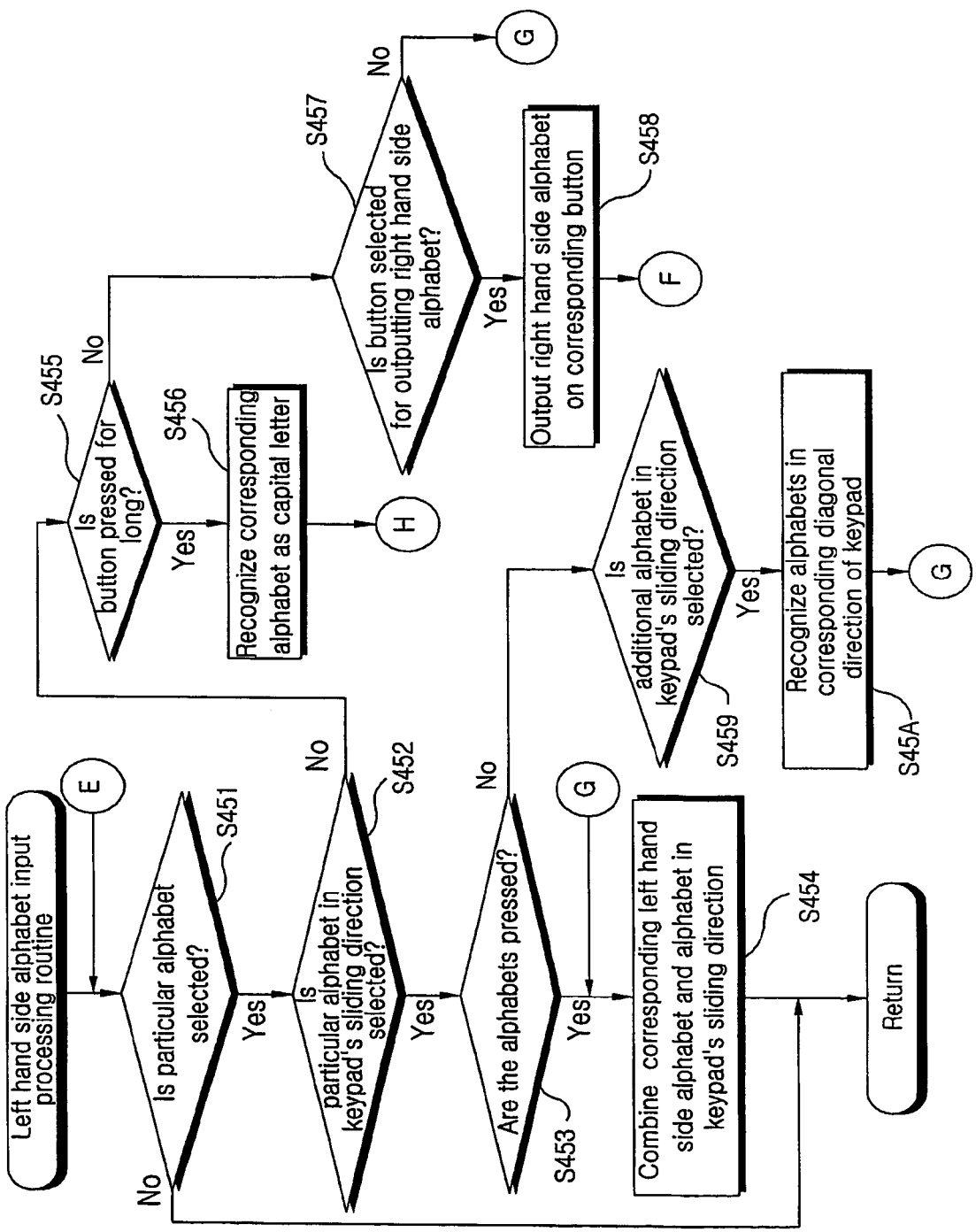
FIG. 15 and FIG. 16 are flow charts describing in detail, respectively, the input of letters on the left and right hand sides in Roman input mode of FIG. 11.

More details on the left hand side alphabet input process in step 450 will now be provided below, referring to FIG. 15.

The microprocessor 70 decides whether a (Roman alphabet) button on the keypad 10 is pressed down by the user (S451), and if a button is being pressed down the microprocessor 70 decides whether the keypad 10 is slid in any direction and a certain character along the direction is selected (S452).

If the user selected a character by sliding the keypad 10, the microprocessor 70 decides whether the button the user selected is being pressed down and the keypad 10 maintains its slid state (S453).

If so, the microprocessor 70 combines the left hand side Roman alphabet on the corresponding button with the Roman alphabet allocated in the sliding direction of the keypad 10, and performs the step 470 (S454).

However, if it turns out in step 452 that a particular alphabet was not selected by the sliding motion of the keypad 10, the microprocessor 70 decides whether a particular button on the keypad 10 was being pressed for long (S455). If the corresponding button was being pressed for long by the user, the microprocessor 70 recognizes the corresponding alphabet as a capital letter and performs the steps after S451 (S456).

In addition, if it turns out in step 455 that the corresponding button was not being pressed for long, the microprocessor 70 decides whether the user operates a key for outputting a right hand side alphabet instead on the corresponding button (S457). If this is the case, the microprocessor 70 outputs the right hand side alphabet on the corresponding button and performs the steps after S420 (S458).

Further, if the button the user selected is not being pressed and the slid state of the keypad 10 is not maintained, the microprocessor 70 decides whether an additional character allocated in the corresponding sliding direction of the keypad 10 is selected (S459). If the user indeed selected the additional particular alphabet in the corresponding sliding direction of the keypad 10, the microprocessor 70 recognizes it as a vowel allocated in the corresponding diagonal sliding direction of the keypad 10 and performs the steps after S454 (S45A).

Figure 16:
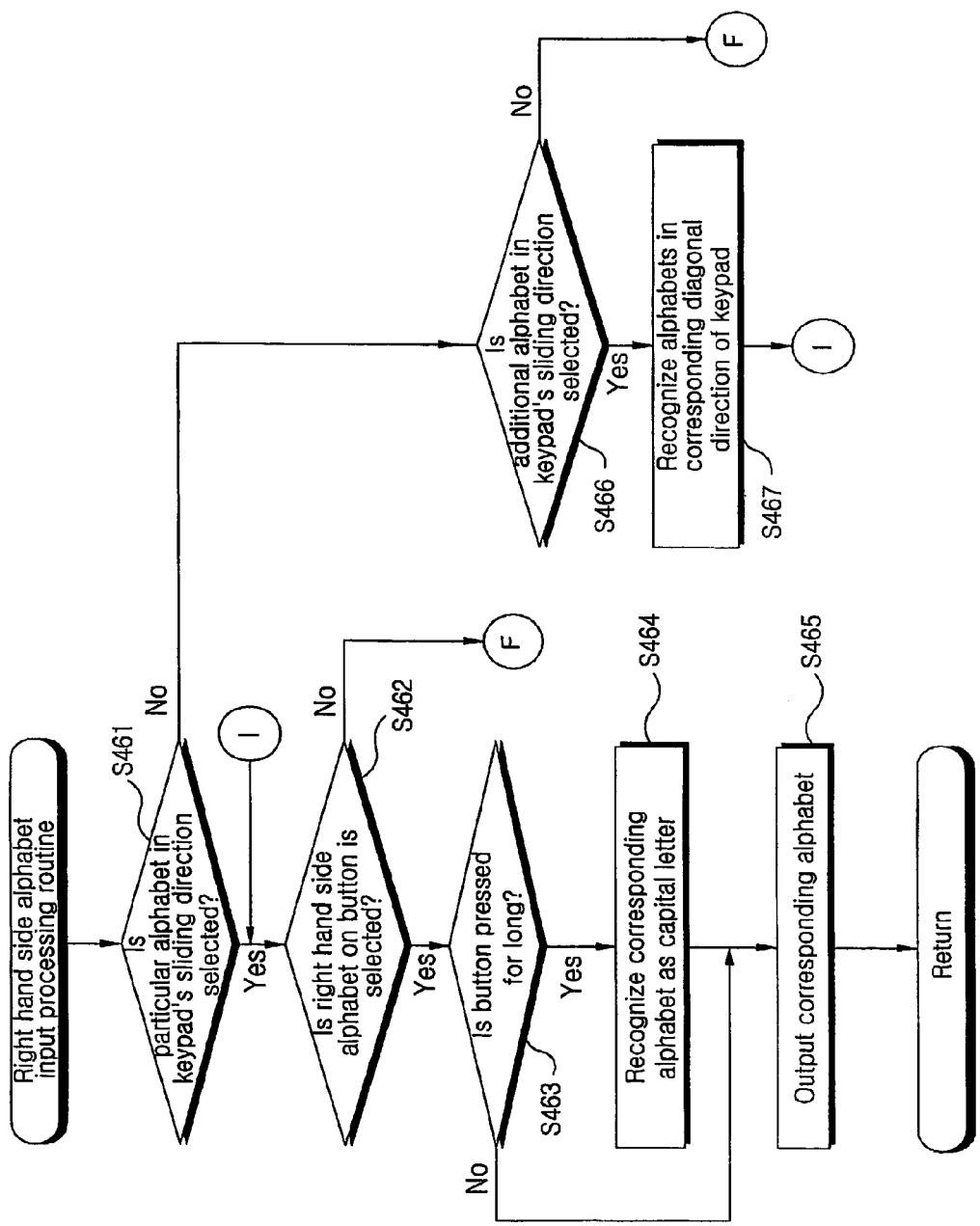
Figure 17:
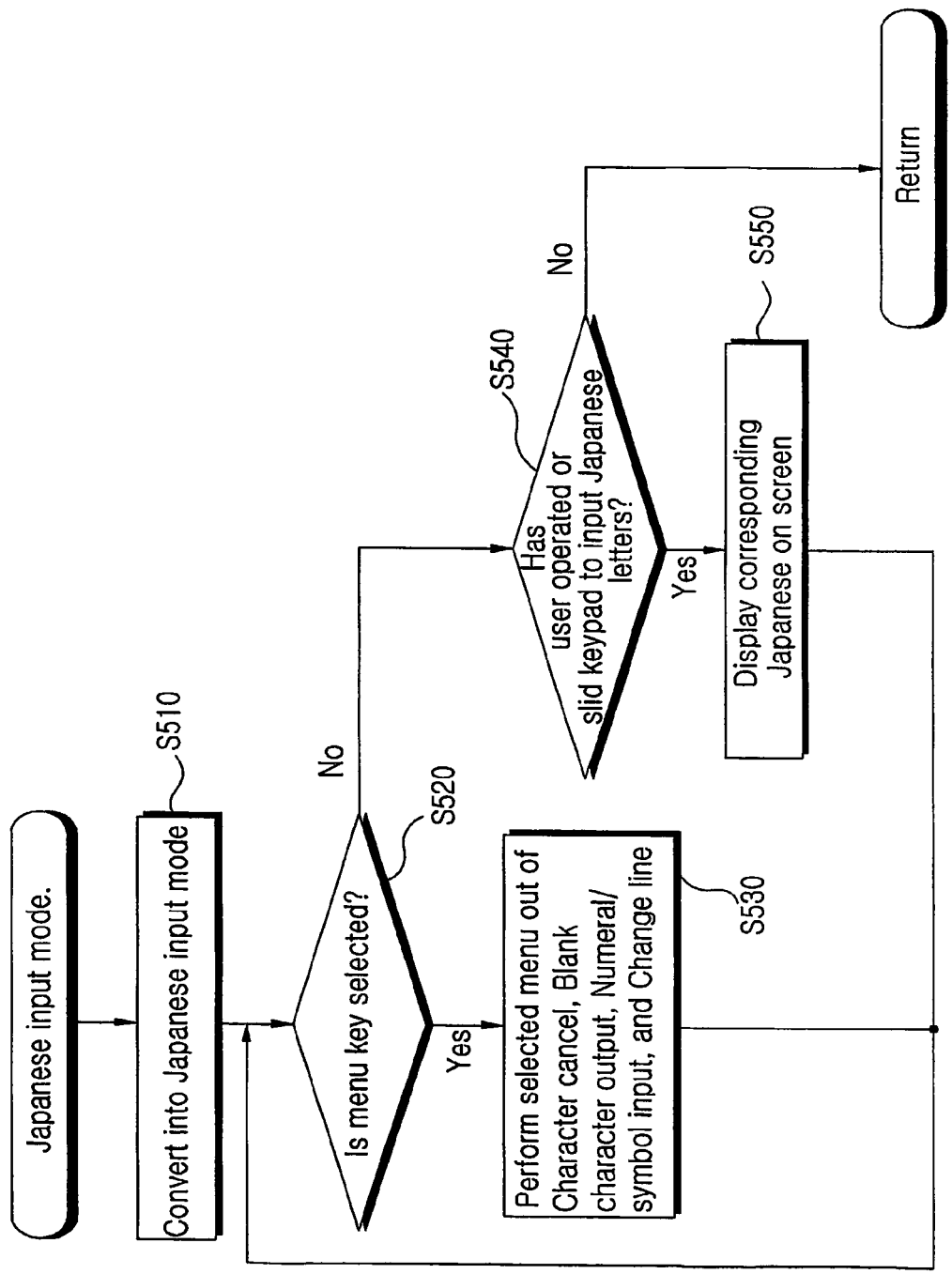
FIG. 17 is a flow chart describing in detail a method for inputting characters/numerals in Japanese input mode of FIG. 10.

More details on the right hand side alphabet input process in step 460 will now be provided below, referring to FIG. 16.

The microprocessor 70 decides if the user slid the keypad 10 by using the frictional force of his hand without pressing any button on the keypad 10 (S461). And if a certain alphabet was selected in this manner the microprocessor 70 decides whether the user pressed a certain button on the keypad 10 to input the character (S462).

If it turns out that the user indeed pressed that particular button on the keypad 10, the microprocessor 10 decides the corresponding button was being pressed for long (S463). If so, it recognizes the corresponding alphabet as a capital letter (S464).

Later, the microprocessor 70 outputs the capital letter it recognized in step 464 to the display, performing the step 470 (S465).

However, if it turns out that the keypad 10 was not slid by the user and thus, no alphabet was selected, the microprocessor 70 decides whether two alphabets, instead of one, was being selected by the sliding motion of the keypad 10 (S466). If so, the microprocessor 70 recognizes the two alphabets as the vowels allocated in a corresponding diagonal sliding direction of the keypad 10 and performs the steps after S462 (S467).

On the other hand, if in step 200 the user selected the Japanese input mode, the microprocessor 70 detects a key signal inputted from the button-operation recognition unit 20 and/or the keypad sliding recognition unit 30 in accordance with the operation of a plurality of buttons on the keypad 10 or the sliding operation of the keypad 10 in the upward, downward, left, right and diagonal directions, combines Hiragana, Katakana, Chinese and numerals/symbols, and displays the result on the display 90 (S500).

More specifically speaking, if the user selects the Japanese input mode the microprocessor 70 of the mobile communication terminal 1 is converted into the Japanese input mode and maintains a Japanese input standby state (S510). In this state the microprocessor 70 decides whether the user presses a menu key (e.g., the 'call' key on the keypad 10) and then to which direction (e.g., the upward, downward, left or right directions) the keypad 10 is slid, each directing being designated as the character cancel, the blank character output, the numeral and symbol input, and the line change menu (S520).

If it turns out that the user selected a menu key, the microprocessor 70 performs a corresponding menu selected out of the character cancel, the blank character output, the numeral and symbol input, and the line change menu (S530).

However, if it turns out that the user did not select any menu key (S520), that is, if the user did not select one of menu keys out of the character cancel, the blank character output, the numeral and symbol input, and the line change menu, the microprocessor 70 decides whether the user inputs Hiragana, Katakana or Japanese combined with Chinese by pressing the buttons on the keypad 10 and/or sliding the keypad 10 in the upward, downward, left, right and diagonal directions (S540).

If it turns out that the user inputted Japanese words by pressing the buttons on the keypad 10 and/or sliding the keypad 10 in the upward, downward, left, right and diagonal directions, the microprocessor 70 displays the input Hiragana, Katakana and Japanese combined with Chinese on the display 90 and perform the steps after S520 (S550).

When the character input process (S300 to S 500) in one of the input modes including the Korean input mode, the Roman input mode and the Japanese input mode is complete, the microprocessor 70 of the mobile communication terminal 1 decides whether the user selects a key signal for storing the words (or the message) he inputted (S600).

If the user selected the storage key for storing the message, the microprocessor 70 stores the message (S700). If the user did not select the storage key, on the other hand, the microprocessor 70 either ends or maintains the character mode according to what the user decides (S800).

While the invention has been shown and described with reference to certain preferred embodiments thereof, it will be understood by those skilled in the art that various changes in form and details may be made therein without departing from the spirit and scope of the invention as defined by the appended claims.

INDUSTRIAL APPLICABILITY

The apparatus and method for inputting characters and numerals to the display of the mobile communication system according to the present invention can be very advantageously used in that the arrangement of consonants and vowels of a language (such as Korean, Roman and Japanese) written on the buttons of the keypad is simple and easy for the ordinary user to learn within a short amount of time, and the frequency of inputting characters and numerals to the present invention terminal is much less than that of the related art terminal. Compared with other mobile communication terminals mounted with keypads having joystick, navigation key and switch functions, the present invention mobile communication terminal is cost-effective, and can provide a substantial contribution to the wide spread of mobile communication terminals. In addition, because of the improved input rate of characters and numerals, the user can perform writing a text message, sending emails, chatting and information search over the Internet more easily and conveniently, resultantly reducing the communication cost.

What is claimed is:

1. An apparatus for inputting characters and numerals to a display of a mobile communication system for use with communication with another user or data storage, the apparatus comprising:

a keypad having a plurality of buttons and consonants and vowels of each language out of Korean, Roman, Japanese and Chinese, numerals, functional keys allocated in at least four sliding directions, and generating a key signal according to the button operation of a user who wants to input a character or a numeral, and the sliding motion of the keypad in at least four directions centering around a the user within a main body of the mobile communication terminal;

a character storage for storing character data of each language supported by the mobile communication terminal;

a program memory for storing an internal operating program of the mobile communication terminal;

a code storage for storing code data corresponding to the buttons arranged on the keypad and the sliding directions of the keypad;

a button-operation recognition unit for detecting a key operating state of each of the buttons on the keypad;

a keypad sliding recognition unit for detecting a key operating state according to the sliding motion of the keypad in at least four direction;

a microprocessor, driven by the operating program in the program memory in response to a key operation state detection signal inputted through the button-operation recognition unit and/or the keypad sliding recognition unit, for deciding with reference to the character data in the character storage which phoneme of what language the user inputs, generating a display control signal for displaying the phoneme of the corresponding language referring to the code data in the code storage, and outputting the phoneme;

a display driving unit, under a display control signal outputted from the microprocessor, for outputting a driving control signal displaying a character and a numeral the user selects by pressing a button on the keypad or sliding the keypad in a desired direction; and a display, under the driving control signal outputted form the display driving unit, for displaying on a screen the character and the numeral the user selects.

2. The apparatus according to claim 1, wherein if the keypad is a Korean alphabet keypad, Korean consonants are allocated to each of the buttons on the keypad, and Korean vowels are allocated in at least four sliding directions of the keypad.

3. The apparatus according to claim 2, wherein the Korean vowels allocated in at least four sliding directions of the keypad are ㅏ, ㅑ, ㅗ, ㅡ, ㅣ, ㅜ, ㅔ, and ㅓ, each being disposed in upper left, upward, upper right, left, right, lower left, downward, and lower right directions, respectively.

4. The apparatus according to claim 2, wherein the Korean vowels allocated in at least four sliding directions of the keypad are inputted by pressing a button once, twice and for long, and by sliding the keypad in a desired direction.

5. The apparatus according to claim 1, wherein if the keypad is a Roman alphabet keypad, two Roman alphabets are allocated to each of the buttons on the keypad, and vowels/consonants, special characters and functional keys are allocated in at least four sliding directions of the keypad.

6. The apparatus according to claim 5, wherein the vowels/consonants allocated in at least four sliding directions of the keypad are A, E, I, O, U, W, and Y, each being disposed in upper left, upward, upper right, left, right, lower left, and lower right directions, respectively; and if the user slides the keypad in the downward direction while pressing a corresponding button a second alphabet on the right hand side of a button is inputted.

7. The apparatus according to claim 5, where the combination of alphabets written on each of the buttons on the keypad and allocated in at least four sliding directions of the keypad comprises the following steps of:

if the user presses a button on the keypad and slides the keypad while pressing the button, a first alphabet on the corresponding button and an alphabet allocated in the sliding direction of the keypad are inputted simultaneously; and if the user slides the keypad by using the frictional force of the user's hand without pressing any button on the keypad beforehand and presses a button on the keypad thereafter, a second alphabet on the button and an alphabet allocated in the sliding direction of the keypad are inputted simultaneously.

8. The apparatus according to claim 1, wherein if the keypad is a Japanese alphabet keypad, あ are allocated to each of the buttons on the keypad, and い, う, え, お/characters or functional keys are allocated in at least four sliding directions of the keypad.

9. The apparatus according to claim 8, wherein voiced sound, long sound, Chinese, and Hiragana/Katakana conversion are allocated to the rest of the buttons where あ are not allocated.

10. The apparatus according to claim 1, wherein to input 'ん',the user presses a corresponding button on the keypad one more time;

to input 'っ',the user slides the keypad in a sliding direction where う is allocated and presses a button with 'た'on the keypad for long;

to input a semivowel among や, ゆ, and よ', the user presses a button with 'や' or slides the keypad while pressing the button with 'や',inputs や, ゆ, and よ', and then presses the corresponding button for long;

to input a semi-voiced sound, the user inputs a character in the row of 'は'and presses a corresponding button for long; and to express 'f' sound in Japanese, such as 'ア, イ, エ and オ' marked after the 'フ',the user inputs a character in the row of 'ア'and presses a corresponding button for long.

11. A method for inputting characters and numerals to a display of a mobile communication terminal, the method comprising the steps of:

(1) at a microprocessor of the mobile communication terminal, deciding which language alphabet mode is selected by a user;

(2) at the microprocessor of the mobile communication terminal, deciding the language alphabet mode the user selected is one of Korean input mode, Roman input mode, and Japanese input mode;

(3) if the user selects the Korean input mode, detecting, in the microprocessor, a key signal inputted from a button-operation recognition unit and a keypad sliding recognition unit in accordance with the operation of a plurality of buttons on a keypad and the sliding operation of the keypad in upward, downward, left, right and diagonal directions, combining Korean consonant and vowels and numerals/symbols, and displaying a result thereof on a screen of the mobile communication terminal;

(4) if the user selects the Roman input mode, detecting, in the microprocessor, a key signal inputted from the button-operation recognition unit and the keypad sliding recognition unit in accordance with the operation of a plurality of buttons on the keypad and the sliding operation of the keypad in upward, downward, left, right and diagonal directions, combining consonant and vowels and numerals/symbols, and displaying a result thereof on the screen of the mobile communication terminal;

(5) if the user selects the Japanese input mode, detecting, in the microprocessor, a key signal inputted from the button-operation recognition unit and the keypad sliding recognition unit in accordance with the operation of a plurality of buttons on the keypad and the sliding operation of the keypad in upward, downward, left, right and diagonal directions, combining Hiragana, Katakana, Chinese and numerals/symbols, and displaying a result thereof on the screen of the mobile communication terminal;

(6) if a character input process in one of the input modes including the Korean input mode, the Roman input mode and the Japanese input mode is complete, deciding, in the microprocessor, whether the user selects a key signal for storing the input characters, and storing the input characters according to the user's selection; and (7) at the microprocessor, maintaining or ending the character mode according to the user's selection whether to end the character mode or not.

12. The method according to claim 11, wherein if the user selects the Korean input mode, the step (3) comprises the sub-steps of:
- (3-1) at the microprocessor of the mobile communication terminal, converting a mode into the Korean input mode,
- (3-2) at the microprocessor, deciding whether the user operates a menu key;
- (3-3) after the user operates the menu key, performing, in the microprocessor, the menu selected from character cancel, blank character output, numeral and symbol input, and line change menus, and repeating the procedure after the step (3-2);
- (3-4) if the user does not select any menu key, deciding, in the microprocessor, whether the user inputs consonants and vowels by pressing the buttons on the keypad and/or sliding the keypad in the upward, downward, left, right and diagonal directions;
- (3-5) if the user presses the buttons on the keypad and/or slides the keypad in the upward, downward, left, right and diagonal directions, checking, in the microprocessor, the input of Korean consonants and monophthongs;
- (3-6) if the user presses the buttons on the keypad and/or slides the keypad in the upward, downward, left, right and diagonal directions, checking, in the microprocessor, the input of Korean consonants and diphthongs; and
- (3-7) displaying on a display Korean words obtained by combining the Korean consonant, monophthongs and diphthongs, and repeating the procedure after the step (3-2).

13. The method according to claim 12, wherein the step (3-5) comprises the sub-steps of:
- (3-5-1) at the microprocessor, deciding whether a (Korean alphabet) button on the keypad is pressed down by the user;
- (3-5-2) if the button is being pressed down, deciding, in the microprocessor, whether the keypad 10 slid in a direction and a certain vowel along the direction is selected by the user;
- (3-5-3) if the user selects the vowel in the sliding direction of the keypad, deciding, in the microprocessor, whether one consonant and one vowel are selected;
- (3-5-4) if one consonant and one vowel are selected by the user, deciding, in the microprocessor, whether the user selects the consonant button again;
- (3-5-5) if the consonant button is selected again, combining, in the microprocessor, the corresponding consonant and a diphthong;
- (3-5-6) in the microprocessor, deciding whether the Korean letter the user inputted is a complete form of Korean and if so, performing the step (3-7);
- (3-5-7) if the Korean letter the user inputted is not a complete form of Korean, outputting, in the microprocessor, the corresponding consonant only assuming that the user inputted the consonant only, and performing the step (3-7);
- (3-5-8) if a certain vowel allocated in a sliding direction of the keypad is not selected, deciding, in the microprocessor, whether the corresponding button is being pressed for long;
- (3-5-9) if the button is pressed for long, recognizing, in the microprocessor, the corresponding consonant as a fortis and performing the procedure after the step (3-5-1);
- (3-5-10) if one consonant and one vowel are not selected in the step (3-5-3), deciding, in the microprocessor, whether the user selects one consonant and two vowels by sliding the keypad; and
- (3-5-10) if one consonant and two vowels are selected, recognizing, in the microprocessor, the two vowels as vowels allocated to a corresponding diagonal direction of the keypad and performing the procedure after the step (3-5-4); and if one consonant and two vowels are not selected, performing the procedure after the step (3-5-6).

14. The method according to claim 12, wherein the step (3-6) comprises the sub-steps of:
- (3-6-1) at the microprocessor, deciding whether the user slides the keypad by using the frictional force of a hand while no button on the keypad is being pressed;
- (3-6-2) if the user slides the keypad and selects a particular vowel along the direction, deciding, in the microprocessor, whether the user presses a button on the keypad to input a consonant;
- (3-6-3) if the consonant is selected, deciding, in the microprocessor, whether the vowel and the consonant the user selects are being pressed;
- (3-6-4) if the consonant and the vowel the user selects are pressed, deciding, in the microprocessor, whether the consonant button is selected one more time;
- (3-6-5) if the consonant button is selected one more time, combining, in the microprocessor, the corresponding button and a diphthong;
- (3-6-6) at the microprocessor, whether the Korean letter the user inputted is a complete form of Korean and if the Korean letter is a complete form of Korean performing the step (3-7), and if not a complete form of Korean repeatedly performing the procedure after the step (3-2);
- (3-6-7) if the vowel is not selected by the user in the step (3-6-1), deciding, in the microprocessor, whether the user selects two vowels instead of one by sliding the keypad;
- (3-6-8) if the user selects two vowels by sliding the keypad, recognizing, in the microprocessor, the vowels as vowels in a corresponding diagonal direction of the keypad, and performing the procedure after the step (3-6-2);
- (3-6-9) if the consonant is not selected, deciding, in the microprocessor, whether the user selects a '*' button;
- (3-6-10) if the '*' button is selected, deciding, in the microprocessor, whether two vowels are being pressed down;
- (3-6-11) if two vowels are pressed, recognizing, in the microprocessor, the two vowels as vowels in a corresponding diagonal direction of the keypad;
- (3-6-12) at the microprocessor, outputting the corresponding vowel exclusively according to whether the user selects the '*' button once or twice, and performing the procedure after the step (3-2);
- (3-6-13) if the particular button on the keypad is not selected again, deciding, in the microprocessor, whether the user presses the button for long; and
- (3-6-14) if the corresponding button is pressed for long, recognizing, in the microprocessor, the corresponding consonant as a fortis, and performing the procedure after the step (3-6-6).

15. The method according to claim 11, wherein the step (4) comprises the sub-steps of:
- (4-1) at the microprocessor of the mobile communication terminal, converting a mode into the Roman input mode
- (4-2) at the microprocessor, deciding whether the user operates a menu key;
- (4-3) after the user operates the menu key, performing, in the microprocessor, the menu selected from character cancel, blank character output, numeral and symbol input, and line change menus, and repeating the procedure after the step (4-2);

(4-4) if the user does not select any menu key, checking, in the microprocessor, whether the user inputs Roman consonants and vowels by pressing the buttons on the keypad and/or sliding the keypad in the upward, downward, left, right and diagonal directions;

(4-5) if the user presses the buttons on the keypad and/or slides the keypad in the upward, downward, left, right and diagonal directions, checking, in the microprocessor, the input of Roman consonants and vowels on the left hand sides of the buttons and in the sliding directions of the keypad;

(4-6) if the user presses the buttons on the keypad and/or slides the keypad in the upward, downward, left, right and diagonal directions, checking, in the microprocessor, the input of consonants and vowels on the right hand sides of the buttons and in the sliding directions of the keypad; and (4-7) displaying on a display Roman words obtained by operating the consonants on the left and right hand sides of the buttons, and repeating the procedure after the step (4-2).

16. The method according to claim 15, wherein the step (4-5) comprises the sub-steps of:

(4-5-1) at the microprocessor of the mobile communication terminal, deciding whether a particular button on the keypad is pressed down by the user (S451);

(4-5-2) if the button is pressed down, deciding, in the microprocessor, whether the keypad is slid in any direction and a certain character along the direction is selected;

(4-5-3) if the user selects the character by sliding the keypad, deciding, in the microprocessor, whether the button the user selected is continuously pressed down and the keypad maintains the slid state thereof;

(4-5-4) if the button the user selected is continuously pressed down and the keypad maintains the slid state thereof, combining, in the microprocessor, a Roman alphabet on the left hand side of the corresponding button and a Roman alphabet allocated in the sliding direction of the keypad, and performing the step (4-7);

(4-5-5) if the particular alphabet in the sliding direction of the keypad is not selected, deciding, in the microprocessor, whether a particular button on the keypad is pressed by the user for long;

(4-5-6) if the particular is pressed by the user for long, recognizing, in the microprocessor, the corresponding alphabet, as a capital letter and repeatedly performing the procedure after the step (4-5-1);

(4-5-7) if in the step (4-5-5) the corresponding button is not pressed for long, deciding, in the microprocessor, whether the user operates a key for outputting a right hand side alphabet instead on the corresponding button;

(4-5-8) if the user operates the key for outputting the right hand side alphabet on the corresponding button, outputting, in the microprocessor, the right hand side alphabet, and repeatedly performing the procedure after the step (4-2);

(4-5-9) if the button the user selected is not pressed and the slid state of the keypad is not maintained, deciding, in the microprocessor, whether an additional alphabet allocated in the corresponding sliding direction of the keypad is selected; and (4-5-10) if the user selects the additional particular alphabet in the corresponding sliding direction of the keypad, recognizing, in the microprocessor, the alphabet as a vowel allocated in a corresponding diagonal sliding direction of the keypad, and repeatedly performing the procedure after the step (4-5-4).

17. The method according to claim 15, wherein the step (4-6) comprises the sub-steps of:

(4-6-1) at the microprocessor, deciding if the keypad is slid by the frictional force of the user's hand while no button is pressed, and a particular alphabet is selected thereby;

(4-6-2) if the particular alphabet is selected by the sliding motion of the keypad, deciding, in the microprocessor, whether the user presses a certain button on the keypad to input an alphabet thereon;

(4-6-3) if the button on the keypad is operated, deciding, in the microprocessor, whether the corresponding button is pressed by the user for long;

(4-6-4) if the corresponding button is pressed by the user for long, recognizing, in the microprocessor, the corresponding alphabet as a capital letter;

(4-6-5) at the microprocessor, outputting the capital letter and performing the step (4-7);

(4-6-6) if the keypad is not slid by the user and thus no alphabet is selected in the step (4-6-1), deciding, in the microprocessor, whether the user selects two alphabets instead of one by sliding the keypad; and (4-6-7) if the user selects two alphabets by sliding the keypad, recognizing, in the microprocessor, the two characters as vowels allocated in a corresponding diagonal sliding direction of the keypad, and performing the procedure after the step (4-6-2).

18. The method according to claim 11, wherein the step (5) comprises the sub-steps of:

(5-1) at the microprocessor of the mobile communication terminal, converting a mode into the Japanese input mode (5-2) at the microprocessor, deciding whether the user operates a menu key;

(5-3) after the user operates the menu key, performing, in the microprocessor, the menu selected from character cancel, blank character output, numeral and symbol input, and line change menus, and repeating the procedure after the step (5-2);

(5-4) if the user does not select any menu key, checking, in the microprocessor, whether the user inputs Hiragana, Katakana, and Japanese combined with Chinese by pressing the buttons on the keypad and/or sliding the keypad in the upward, downward, left, right and diagonal directions; and (5-5) at the microprocessor, displaying on a display Japanese words composed of Hiragana, Katakana, and Japanese combined with Chinese the user inputted by pressing the buttons on the keypad and/or sliding the keypad, and repeatedly performing the procedure after the step (5-2).

* * * * *